(12) United States Patent
McCarthy et al.

(10) Patent No.: US 11,625,771 B2
(45) Date of Patent: *Apr. 11, 2023

(54) SYSTEMS AND METHODS FOR TRANSFERRING FUNDS USING A WIRELESS DEVICE

(71) Applicants: FEXCO, Killorglin (IE); First Data Corporation, Coral Springs, FL (US)

(72) Inventors: John F. McCarthy, Killorglin (IE); Brian Frey, Coral Springs, FL (US)

(73) Assignee: FEXCO, Killorglin (IE)

( * ) Notice: Subject to any disclaimer, the term of this patent is extended or adjusted under 35 U.S.C. 154(b) by 1063 days.

This patent is subject to a terminal disclaimer.

(21) Appl. No.: 16/353,908

(22) Filed: Mar. 14, 2019

(65) Prior Publication Data

US 2019/0213673 A1 Jul. 11, 2019

Related U.S. Application Data

(63) Continuation of application No. 13/829,961, filed on Mar. 14, 2013, now Pat. No. 10,275,827.

(51) Int. Cl.
*G06Q 40/02* (2012.01)
(52) U.S. Cl.
CPC .................. *G06Q 40/02* (2013.01)
(58) Field of Classification Search
CPC ........ G06Q 40/00; G06Q 40/02; G06Q 20/10; G06Q 20/102; G06Q 20/40; G06Q 30/04; G06K 7/10415; Y10S 902/08

(Continued)

(56) References Cited

U.S. PATENT DOCUMENTS 6,745,937 B2 6/2004 Walsh et al.
7,159,770 B2 1/2007 Onozu
(Continued)

FOREIGN PATENT DOCUMENTS

EP 1513120 A2 3/2005
KR 10/2010/0018744 A 2/2010
(Continued)

OTHER PUBLICATIONS

International Search Report and Written Opinion of PCT/EP2012/068581, dated Nov. 15, 2012, 8 pages.
(Continued)

*Primary Examiner* — Hani M Kazimi
(74) *Attorney, Agent, or Firm* — Kilpatrick Townsend & Stockton LLP

(57) ABSTRACT

According to one embodiment, a method for performing a money withdrawal transaction includes transmitting a transaction identifier for use by an ATM. The method also includes receiving the transaction identifier from a mobile device of a user, where the mobile device obtains the transaction identifier by capturing machine readable code from the ATM. The method further includes receiving a withdrawal amount from the mobile device along with an identification of an account for use in the withdrawal transaction. The method additionally includes transmitting withdrawal information to a payment service provider to effectuate authorization of a withdrawal of funds from the ATM in an amount equal to the withdrawal amount. The withdrawal information is transmitted from the payment service provider to the ATM and subsequently received therefrom along with a PIN that is input by the user into the ATM. This process mimics existing withdrawal transaction processes of the ATM.

18 Claims, 13 Drawing Sheets

(58) Field of Classification Search
USPC .................................................. 705/39–43
See application file for complete search history.

(56) References Cited

U.S. PATENT DOCUMENTS

| | | | |
|---|---|---|---|
| 7,379,921 | B1 | 5/2008 | Kiliocote |
| 7,483,858 | B2 | 1/2009 | Foran et al. |
| 7,810,720 | B2 | 10/2010 | Lovett |
| 7,861,922 | B2 | 1/2011 | Lee et al. |
| 7,865,401 | B2 | 1/2011 | Nakajima |
| 7,896,235 | B2 | 3/2011 | Ramachandran |
| 8,380,177 | B2 | 2/2013 | Laracey |
| 8,632,000 | B2 | 1/2014 | Laracey |
| 9,010,627 | B1 * | 4/2015 | Prasad ................ G06Q 20/202 235/379 |
| 10,467,604 | B1 * | 11/2019 | Dorsch .................. G07F 19/20 |
| 2001/0051915 | A1 | 12/2001 | Ueno et al. |
| 2002/0147913 | A1 | 10/2002 | Lun Yip |
| 2005/0009564 | A1 | 1/2005 | Hayaashi et al. |
| 2005/0029358 | A1 | 2/2005 | Mankins |
| 2005/0203854 | A1 | 9/2005 | Das et al. |
| 2006/0100961 | A1 | 5/2006 | Paterno |
| 2006/0191996 | A1 | 8/2006 | Drummond |
| 2006/0206709 | A1 | 9/2006 | Labrou et al. |
| 2007/0100651 | A1 | 5/2007 | Ramer et al. |
| 2007/0130085 | A1 | 6/2007 | Zhu |
| 2007/0174198 | A1 | 7/2007 | Kasahara et al. |
| 2007/0295805 | A1 | 12/2007 | Ramachandran |
| 2008/0034221 | A1 | 2/2008 | Ayman et al. |
| 2008/0040211 | A1 | 2/2008 | Walker et al. |
| 2008/0078831 | A1 | 4/2008 | Johnson et al. |
| 2008/0162348 | A1 | 7/2008 | Lee et al. |
| 2008/0195536 | A1 | 8/2008 | Karns et al. |
| 2008/0222048 | A1 | 9/2008 | Higgins et al. |
| 2008/0228642 | A1 | 9/2008 | Kim et al. |
| 2009/0088202 | A1 | 4/2009 | Toomer et al. |
| 2009/0099961 | A1 | 4/2009 | Ogilvy |
| 2009/0157472 | A1 | 6/2009 | Burazin et al. |
| 2009/0222353 | A1 | 9/2009 | Guest et al. |
| 2009/0254479 | A1 | 10/2009 | Pharris |
| 2009/0265211 | A1 | 10/2009 | May et al. |
| 2010/0017327 | A1 | 1/2010 | Treadwell et al. |
| 2010/0063905 | A1 | 3/2010 | De Tena Sainz |
| 2010/0125510 | A1 | 5/2010 | Smith et al. |
| 2010/0131415 | A1 | 5/2010 | Sartipi |
| 2010/0191650 | A1 | 7/2010 | Ramachandran |
| 2010/0211475 | A1 | 8/2010 | Nojima et al. |
| 2011/0016047 | A1 | 1/2011 | Wu |
| 2011/0066550 | A1 | 3/2011 | Shank et al. |
| 2011/0238573 | A1 * | 9/2011 | Varadarajan ....... G06Q 20/1085 705/43 |
| 2011/0246316 | A1 | 10/2011 | Cincera |
| 2011/0251892 | A1 | 10/2011 | Laracey |
| 2012/0160912 | A1 | 6/2012 | Laracey |
| 2012/0226610 | A1 | 9/2012 | Gill |
| 2012/0265679 | A1 | 10/2012 | Caiman |
| 2013/0035787 | A1 | 2/2013 | Canter |
| 2013/0086465 | A1 | 4/2013 | Boudville |
| 2013/0238455 | A1 | 9/2013 | Laracey |
| 2013/0246203 | A1 | 9/2013 | Laracey |
| 2013/0311313 | A1 | 11/2013 | Laracey |
| 2014/0046842 | A1 | 2/2014 | Irudayam |
| 2014/0108249 | A1 | 4/2014 | Kulpati |
| 2014/0138435 | A1 | 5/2014 | Khalid |
| 2014/0149293 | A1 | 5/2014 | Laracey |
| 2014/0191028 | A1 | 7/2014 | Laracey |
| 2014/0263618 | A1 | 9/2014 | McCarthy |
| 2014/0279490 | A1 | 9/2014 | Caiman |

FOREIGN PATENT DOCUMENTS

| | | |
|---|---|---|
| KR | 10/2011/0039946 A | 4/2011 |
| KR | 10/2011/0053216 A | 5/2011 |
| KR | 10/2012/0103924 A | 9/2012 |
| WO | 2010/125577 A1 | 11/2010 |
| WO | 2012/088512 A2 | 6/2012 |
| WO | 2013/009063 A2 | 1/2013 |
| WO | 2013/173339 A1 | 11/2013 |
| WO | 2014/130222 A1 | 8/2014 |
| WO | 2014/158817 A1 | 10/2014 |

OTHER PUBLICATIONS

International Search Report dated May 20, 2014 for International Patent Application No. PCT/US2014/013955 filed on Jan. 30, 2014, all pages.

International Search Report and Written Opinion dated Dec. 7, 2011 for International Patent Application No. PCT/US2011/031696 filed on Apr. 8, 2011, all pages.

International Search Report and Written Opinion dated Aug. 14, 2012 for International Patent Application No. PCT/US2011/067197 filed on Dec. 23, 2011, all pages.

International Search Report and Written Opinion dated Nov. 23, 2012 for International Patent Application No. PCT/EP2012/068581 filed on Sep. 20, 2012, all pages.

International Search Report and Written Opinion dated Sep. 13, 2013 for International Patent Application No. PCT/US2013/040953 filed on May 14, 2013, all pages.

U.S. Non-Final Office Action dated Nov. 13, 2014 for U.S. Appl. No. 13/239,054, filed Sep. 21, 2011, all pages.

Kharif, Olga. "Apple Plans Services That Lets Iphone Users Pay With Handsets" (http://www.bloombera.com/news/2011-01-25/apple-plans-service-that-lets-iphone-users-pav-with-handsets.html) dated Jan. 24, 2011 in three pages. Downloaded on Apr. 16, 2012.

Roger. "Starbucks Tests QR Code Payment" (http://2d-code.eo.uk/starbucks-ar-code-pavment/) dated Sep. 23, 2009 in four pages. Downloaded on Apr. 16, 2012.

Bruce, Laura. Super AT Ms and Kiosks. CNN Money.com. Apr. 4, 2001. w http ://ennmoney.printthis.clickability.com/pt/cpt?action=cpt&title=Super+ATMs+and+kiasks+Apr.+4.

Non-Final Office Action dated Sep. 10, 2014 in related U.S. Appl. No. 13/829,961, all pgs.

Final Office Action dated Jan. 29, 2018 in related U.S. Appl. No. 13/829,961, all pgs.

Notice of Allowance dated Dec. 20, 2018 in related U.S. Appl. No. 13/829,961, all pgs.

* cited by examiner

SYSTEMS AND METHODS FOR TRANSFERRING FUNDS USING A WIRELESS DEVICE

CROSS-REFERENCES TO RELATED APPLICATIONS

This application is a continuation of U.S. patent application Ser. No. 13/829,961, filed Mar. 14, 2013, now U.S. Pat. No. 10,275,827 entitled "SYSTEMS AND METHODS FOR TRANSFERRING FUNDS USING A WIRELESS DEVICE," which is hereby incorporated herein by reference.

BACKGROUND OF THE INVENTION

Embodiments of the invention are generally directed toward performing payment transactions and more specifically toward performing payment transaction involving a wireless device.

Commerce involving wireless devices, such as mobile phones, is quickly becoming a convenient and popular way to perform transactions. One advantage of using wireless devices is the ability to store large amounts of data and personal information. Another advantage is the ease and accessibility wireless devices provide. For example, wireless devices allow individuals to exchange funds without requiring the individuals to access a bank or other financial institution. Further, wireless devices replace the need for consumers to carry other payment tools, such as credit and/or debit cards. A disadvantage of using wireless devices in some commerce situations is the need for merchants to update existing devices or add entirely new devices to accommodate the operations of the wireless device. Another disadvantage is rolling out or introducing new wireless devices that support new payment methods. These issues often raise various problems for both merchants and consumers. For example, the costs required for merchants to acquire new hardware in order to provide the new payment method may be large and, therefore, may make it difficult for merchants to justify offering the new payment method. In addition, consumers may be unwilling to invest in a wireless device having the hardware necessary for the new payment method until they are comfortable that enough merchants offer or accept the new payment method. Likewise, merchants may be unwilling to invest in the hardware necessary for the new payment method until they are confident that consumer demand is high enough to justify the investment (e.g., that enough consumers own wireless devices with the appropriate hardware). This situation can result in a stalemate where neither consumers nor merchants are willing to invest in the required hardware first. There is a need to address these disadvantages to provide more efficient approaches that minimize the use of resources and the necessity for devices to be adapted for use in commerce transactions. There is also a need to improve interoperability of the technical means used in wireless device commerce transactions.

A further disadvantage is the current onus upon users owing to the considerable amount of data input that is required in commerce transactions. A more simplified approach would be desirable that minimizes user input, and that works in conjunction with an approach that address interoperability and adaptability issues. Another disadvantage still may be the ability to steal the information (personal or financial) stored on the wireless device. Since wireless devices continue to grow in popularity and since worldwide access to these devices continues to increase, the use of wireless devices in commerce will likely also increase. There is therefore a need to improved security of the devices in the commerce transactions.

There is a need to address the disadvantages described above and provide for improved methods of using wireless device in commerce.

BRIEF SUMMARY OF THE INVENTION

Embodiments of the invention provide systems and methods for performing payment transactions that involve wireless devices. According to one embodiment, a method for performing a money withdrawal transaction is provided herein. The method includes associating a transaction identifier with a geographic identifier of an automated teller machine (ATM). The transaction identifier includes machine readable code, such as a QR code or a code that may be transmitted wirelessly to a mobile device (e.g., via Bluetooth, NFC communication, and the like). The method also includes transmitting the transaction identifier for display on the ATM. The method further includes receiving the transaction identifier from a mobile device of a user along with identification information for the mobile device. The mobile device may obtain the transaction identifier from the ATM by capturing the machine readable code displayed on the ATM (e.g., photographing the QR code displayed on the ATM).

The method additionally includes determining a geographic location of the ATM based on the association between the transaction identifier and the geographic identifier of the ATM. The method additionally includes determining a service account associated with the user based on the identification information for the mobile device. The method additionally includes transmitting information on the ATM's geographic location to the mobile device along with withdrawal information that is unique to the user. The withdrawal information that is unique to the user may include: a default withdrawal amount, a language preference, and/or an identification of withdrawal accounts registered with the payment service provider.

The method may additionally include receiving a withdrawal amount and a selection of an account from which to withdraw funds from the mobile device. In other embodiments, the selection of an account from which to withdraw funds may be received from a payment host system. The method may additionally include accessing the service account to determine account information associated with the account identified from which to withdraw funds. The method may additionally include transmitting the withdrawal amount and account information to the ATM and receiving, from the ATM, the withdrawal amount and account information along with a personal identification number (PIN) provided by the user. The method may additionally include transmitting the withdrawal amount, account information, and PIN to a payment service provider to authorize withdrawal of funds from the ATM in an amount equivalent to the withdrawal amount. One or more of the above steps may be performed via one or more processors. In some embodiments, the PIN may be input into the ATM by the user. In other embodiments, the PIN may be input into the mobile device by the user.

The machine readable code may be unique to a single withdrawal transaction so that the machine readable code is unusable after completion of the withdrawal transaction. In some embodiments, the method may further include receiving, from the mobile device, a selection of a withdrawal account from among a plurality of identified withdrawal accounts from which to withdraw funds. In some embodiments, the method may further include registering the mobile device with the payment service provider. Registering the mobile device may include receiving account information for one or more withdrawal accounts, receiving a default withdrawal amount, and/or receiving a language preference from the mobile device.

According to another embodiment, a method for performing a money withdrawal transaction is provided herein. The method may include transmitting a transaction identifier for use by a funds dispensing device. The transaction identifier may include machine readable code. The method may also include receiving the transaction identifier from a mobile device of a user. The mobile device may have obtained the transaction identifier by capturing the machine readable code from the funds dispensing device (e.g., photographing a QR code displayed on the funds dispensing device, receiving a wireless transmission including the machine readable code, and the like). The method may further include receiving a withdrawal amount and an identification of an account for use in the withdrawal transaction from the mobile device. The method may additionally include transmitting withdrawal information to a payment service provider to effectuate authorization of a withdrawal of funds from the funds dispensing device in an amount equal to the withdrawal amount. The withdrawal information may include the withdrawal amount and information associated with the identified account. The withdrawal information may be transmitted from the payment service provider to the funds dispensing device and may be subsequently received therefrom along with a personal identification number that is input by the user into the funds dispensing device. This process—i.e., receiving the described withdrawal information from the funds dispensing device—may mimic existing withdrawal transaction processes of the funds dispensing device. In some embodiments, one or more of the steps may be performed via one or more processors.

In some embodiments, the machine readable code may be unique to a single withdrawal transaction so that the machine readable code is unusable after completion of the withdrawal transaction. In some embodiments, the transaction identifier may be transmitted along with information in a previous money withdrawal transaction. In other embodiments, the transaction identifier may be transmitted along with a plurality of transaction identifiers for use by the funds dispensing device. In such embodiments, each transaction identifier may be used in a single money withdrawal transaction. In some embodiments, the existing withdrawal transaction processes of the funds dispensing device may include transmitting an account number of a user, a personal identification number of the user, and a withdrawal amount from the funds dispensing device to the payment service provider.

According to another embodiment, a payment system for performing a money withdrawal transaction is provided herein. The payment system includes a memory device having instruction stored thereon and a processor communicatively coupled with the memory. The instructions stored on the memory cause the processor to perform the following functions: transmit a transaction identifier for use by a funds dispensing device; receive the transaction identifier from a mobile device of a user; receive a withdrawal amount and an identification of an account for use in the withdrawal transaction from the mobile device; and transmit withdrawal information to a payment service provider to effectuate authorization of a withdrawal of funds from the funds dispensing device in an amount equal to the withdrawal amount. The transaction identifier may include machine readable code and the mobile device may have obtained the transaction identifier by capturing the machine readable code from the funds dispensing device. The withdrawal information may include the withdrawal amount and information associated with the identified account. The withdrawal information may be transmitted from the payment service provider to the funds dispensing device and may be subsequently received therefrom along with a personal identification number that is provided by the user, such as by being input into the funds dispensing device or the mobile device. This process may mimic existing withdrawal transaction processes of the funds dispensing device.

According to another embodiment, a payment system for performing a money withdrawal transaction is provided herein. The payment system includes a first subsystem and a second subsystem. The first and/or second subsystems may include one or more processors that allow the subsystems to perform one or more of the functions described below. The first subsystem may associate a transaction identifier with a geographic identifier of an automated teller machine (ATM). The transaction identifier may include machine readable code. The first subsystem may transmit the transaction identifier to the second subsystem for subsequent transmittal to the ATM and display thereon. The first subsystem may receive the transaction identifier from a mobile device of a user along with identification information for the mobile device. The mobile device may have obtained the transaction identifier by capturing the machine readable code displayed on the ATM.

The first subsystem may determine a geographic location of the ATM based on the association between the transaction identifier and the geographic identifier of the ATM. The first subsystem may determine a service account associated with the user based on the identification information for the mobile device. The first subsystem may transmit information on the ATM's geographic location to the mobile device along with withdrawal information that is unique to the user. The first subsystem may receive a withdrawal amount from the mobile device along with a selection of an account from which to withdraw funds. The first subsystem may access the service account to determine account information associated with the account identified from which to withdraw funds. The first subsystem may transmit the withdrawal amount and account information to the second subsystem. The second subsystem may transmit the withdrawal amount and account information to the ATM. The second subsystem may receive the withdrawal amount and account information from the ATM along with a personal identification number (PIN) provided by the user. The second subsystem may transmit the withdrawal amount, the account information, and the PIN to a payment service provider or authorization network. The payment service provider or authorization network may authorize withdrawal of funds from the ATM in an amount equivalent to the withdrawal amount. In some embodiments, the user may input the PIN into the ATM or may input the PIN into the mobile device.

BRIEF DESCRIPTION OF THE DRAWINGS

The present disclosure is described in conjunction with the appended figures.

DETAILED DESCRIPTION OF THE INVENTION

Figure 1:
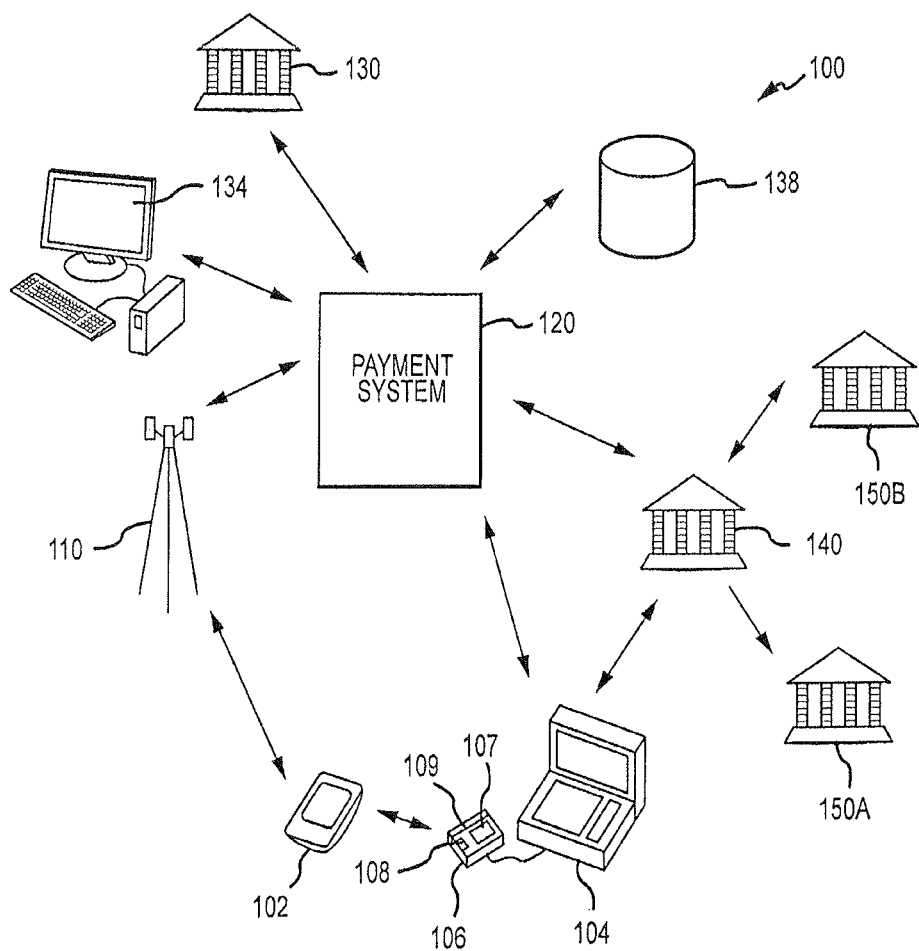
FIG. 1 illustrates a system for performing payment transaction using a wireless device according to an embodiment of the present invention.

Embodiments of the invention provide methods and systems for performing a payment transaction using a wireless device. The system may include a payment system that functions with one or more other systems to perform the payment transaction. For example, the payment system may send and receive message between a wireless device, a merchant's point of sale device, and a payment service provider system to perform the payment transaction. In some embodiments, the payment system may function to settle a transaction between the merchant and customer, such as by transferring funds from the customer's account to the merchant's account. As used herein, a wireless device may refer to any kind of device including: a mobile or cell phone, a personal digital assistant (PDA), a tablet computer (e.g., iPad®), and the like. A merchant point of sale device may include: a device at a checkout location of a merchant, a kiosk, a vending machine, a mobile phone, a wired or wireless device, and the like.

In one embodiment, the payment system receives information from a merchant point of sale device about a pending purchase authorization. The payment system associates the purchase information with an transaction identifier, which may include an alpha numeric code. In some embodiments, the transaction identifier may have a "shelf life" or defined amount of time in which the transaction identifier may be used. This "shelf life" may depend on the merchant, circumstances of the sale, product(s) or service(s) being purchased, and the like. In some embodiments, the code may be assigned to a particular sales channel (such as an individual point of sale device) and the transaction to which it is assigned may change depending on the time stamp of the transaction. In addition, the payment system may be designed to allow transaction identifiers to used for services other than sales transactions, such as a fund transfer transaction, a coupon or voucher association and/or redemption (e.g., the transaction identifier could associate the coupon or voucher with a wireless device or user of the device), and the like.

After associating the transaction identifier with the purchase information, the payment system then transmits the transaction identifier to the merchant point of sale device where the transaction identifier is converted into a machine readable code, such as a bar code or a near field communication code. The barcode is displayed on the merchant point of sale device where it is captured by a wireless device (e.g., mobile phone camera) of the customer purchasing the goods or services. The wireless device converts the barcode into the transaction identifier and transmits the transaction identifier to the payment system. This enables the number of inputs in the transaction process required by the user to be minimized. The payment system then associates the transaction identifier with the pending purchase and transmits an authorization request to a payment service provider (assuming the payment system does not settle the transaction) in order to authorize the transaction.

In some embodiments, one or more transaction identifiers could be cached on the merchant point of sale device. The transaction identifier(s) could be stored on the point of sale device long term, could be uploaded to the point of sale device after some or each transaction, or could be uploaded as part of an end of day batching process. The point of sale device may then convert one or more of the transaction identifiers into machine readable code (e.g., a barcode, near field communication code, and the like) either at the point of sale or prior thereto. Using such approach may speed up purchase transactions by eliminating the need for the point of sale device to establish contact with the payment system before displaying or providing the machine readable code. In such an embodiment, once the merchant entered in or obtained the value purchase amount, the point of sale device could display or provide the machine readable code. The point of sale device (or some other merchant device) would then connect to the payment system and provide the purchase transaction details and the transaction identifier associated with the machine readable code that was displayed or provided. The payment system would then associate both the purchase transaction details and transaction identifier on its system and wait for a communication from the wireless device. One advantage of such approach is that the user can acquire the machine readable code immediately without waiting for the point of sale device to connect to the payment system—thereby reducing the transaction time.

If the transaction is authorized, the payment system receives an authorization from the payment service provider and transmits a confirmation message to the merchant point of sale device and/or the user's wireless device to confirm that the transaction has been authorized. After receiving a payment authorization, the merchant may then deliver the goods and/or services to the customer. The payment system may then transmit a confirmation message to the payment service provider to settle the purchase transaction or may settle the purchase transaction itself. The purchase transaction may involve traditional payment methods, such as credit, debit, checking, and the like, or may involve e-commerce/money transfer transactions (e.g., PayPal®), prepaid money accounts, gift certificates, and the like.

In performing the payment transaction, the payment system may also transmit account information, including account balance information, to the customer and receive an authorization from the customer to continue with the purchase. The system may automatically determine what accounts are appropriate for the transaction and present the account most appropriate for the transaction depending on previously inputted preferences of the user. Transmitting account information, account balance, and the like improves efficiency by minimizing the number of steps in the process. The payment system may further perform a security authentication check to verify that the customer and/or wireless device is associated with the payment account. The security authentication may involve biometric identification, password authentication, location verification, and the like.

In some embodiments, the wireless device may capture the transaction identifier without capturing a barcode. For example, an alphanumeric code may be transmitted from the merchant point of sale to the wireless device, such as by near field communication (NFC), Bluetooth, WiFi, IEEE 802.11, and the like. After receiving the alphanumeric code, the wireless device may transmit the code to the payment system. This advantageously minimizes the input required on behalf of the user.

In some embodiments, the payment system may also store information about the user and/or user's payment account on a cloud network. For example, the user's physical address, phone number, email address, credit card account information, debit account information, e-commerce or online service payment provider account information (e.g., PayPal), checking account information, and the like may be stored on the cloud. The payment system may access the user profile stored on the cloud to access account information and complete a transaction, to access the user's physical address to send to a merchant for shipping purposes, and the like. The utilization of a user profile containing such information increases efficiency and optimizes the system since nearly all information necessary to complete a transaction (e.g., account information, user's physical address, and the like) is centrally stored and the number of steps required to complete the transaction is minimized. In other embodiments, the user may provide account information and/or other information (e.g., shipping address) at the time of the purchase to complete the pending transaction.

The payment system may also receive coupon or voucher information (hereinafter coupon or coupon information) that may be used to complete the pending transaction. For example, the user may capture coupon information with the wireless device by scanning/photographing a barcode of the coupon, manually entering the barcode information, photographing/capturing an image of the coupon, downloading coupon information from a network (e.g., the Internet), receiving coupon information via email and/or accessing an email having coupon information, receiving the coupon via wireless communication (e.g., NFC, Bluetooth) such as by placing the wireless device in close proximity to a system or device having coupon information, and the like. A non-limiting example of coupon or coupon information may include, among other things, a discount on a product such as a manufacturer's or retailer's discount (e.g., an amount or percentage off one or more items or a total purchase price), a rebate, cash back, an offer for a promotional item, a gift certificate, a buy one or more items get one or more items free offer, free shipping offer, and the like. The coupon may be immediately redeemable or redeemable in the future.

The user may send the coupon information to the payment system, which may store the coupon information on a cloud network and/or in the user's profile. The user may also capture and transmit the coupon information using a personal computing device, such as a laptop or personal computer. The coupon information may be transmitted to the payment system via one or more networks, such as the Internet. The coupon information and/or coupon barcode may be displayed in a magazine, book, periodical, on a website, television, advertisement, billboard, and the like. For example, the user may photograph an image of the coupon (or the coupon's barcode) that is displayed on a television commercial or in a magazine advertisement and transmit the coupon information to the payment system. The coupon information may be received by the wireless device via wireless communication (NFC, Bluetooth, and the like) by placing the wireless device in close proximity to a device or object having or storing the coupon information. The payment system may store the coupon information in a user profile on a cloud network and/or may credit the user's prepaid account with an amount of the coupon, or the benefit or special offer associated with the coupon. The coupon and/or credit associated with the coupon may be used in a subsequent transaction involving the item associated with the coupon.

In some embodiments, the user may register with the payment system for the wireless device payment service. The registration may involve providing the payment system with personal information, such as physical address, email address, phone number, identification information, and/or providing payment account information, such as credit card information, checking account information, online money transfer service (e.g., PayPal®) username and/or password, and the like. The payment system may create and manage a user profile for the user, which stores the user's information. The user profile may be stored on a cloud network and/or on a database. The user may access the user profile to set default payment options, shipping address, and the like. Specifying the default account that may be later used by the payment system provides the advantage of increasing efficiency of the system by minimizing the steps that the user is required to perform. The payment system may also manage a prepaid account on behalf of the user, which the user may access and use to pay for goods and/or services or transfer money.

Embodiments of the invention may also be used to purchase one or more goods or services displayed on or in television, magazines, websites, and the like. For example, a good, such as exercise equipment, may be displayed in a magazine promotion, on television, or on a website. The user may capture an image of a barcode displayed on the magazine, television, or website, which barcode is then converted via the user's wireless device into a transaction identifier. The conversion may occur via an application stored on the wireless device (e.g., a smart phone app). The application may automatically identify the barcode as one corresponding to a transaction identifier and may automatically convert the barcode to obtain the transaction identifier. The wireless device may then transmit the transaction identifier to the payment service to pay for the exercise equipment. The payment system may then communicate with the merchant offering the exercise equipment and/or with a payment service provider and/or the user's bank and merchant's bank to complete the transaction. The payment system may then send a confirmation of the purchase to the user's wireless device and may transmit the user's shipping information to the merchant so that the exercise equipment may be shipped to the user.

While embodiments of the invention have been briefly described, further details of embodiments of the invention will be realized with regard to the figures. With regard to FIG. 1, illustrated is an embodiment of a system 100 that may be used to perform the methods described herein. The system 100 includes a payment system 120 that communicates with one or more other systems, components, or devices to perform a payment transaction. The payment system may include one or more computational devices (e.g., servers, computers, processors, memory, and the like), such as those described in FIG. 15, that facilitate in performing the payment transaction. The payment system 120 is communicatively coupled with a merchant point of sale device 104 (POS device), which may be communicatively coupled with a barcode device (not shown) that reads barcodes of products offered by the merchant. The POS device calculates a total sale price for the goods or services purchased during a purchase transaction. The POS device may also be communicatively coupled with a scanner device 106, such as a credit card/debit card scanner. The scanner device 106 may include a display 107, keypad 108, and card reader 109. Information, such as a matrix barcode or Quick Response code (QR code) described herein, may be displayed to the customer (not shown) on display 107, and information (e.g., PIN number) may be input by the customer on keypad 108. The scanner device 106 may also include or be an NFC device or other wireless device (e.g., Bluetooth). Scanner device 106 may be a preexisting credit/debit card reader, such as Verifone's Vx 570 terminal, and need not be specifically designed or updated to operate in accordance with the methods described herein. In other words, the methods and systems described herein may utilize pre or already existing merchant devices and components (e.g., preexisting card readers) and offer the advantage that they may not require specialized or unique equipment or components. As such, system 100 provides an efficient approach to a new commerce method since the merchant may efficiently use resources already widely available and need not acquire new devices adapted or specifically designed to the new commerce method. This minimizes merchants' investment costs and facilitates implementation of the new commerce method. System 100 may essentially be designed to be used with any POS device which has a display screen (i.e., essentially all widespread terminal types currently available). System 100 can also be used by merchants who currently do not have an existing card terminal, since any screen (including mobile phones) which has some connection to the Internet, or another network, may be used. Thus, system 100 provides the additional advantage of being interoperable with a wider range of existing resources than current commerce processes (e.g., credit cards, debit cards, checks, mobile wallets, and the like). System 100 may be used via POS devices which can have any common host connection (PSTN, IP, ISDN, and the like).

Although the POS device 104 is illustrated in FIG. 1 as a physical device, it should be realized that in some embodiments the POS device may represent a website, vending machine, kiosk, magazine advertisement, television screen advertisement, and the like, depending on the type of transaction being performed. For example, if the customer is purchasing a product from an advertisement in a magazine or displayed on the television or on a website, the POS device 104 may represent the magazine, computer, or television displaying the product. In such cases, the POS device need not include a scanner device 106, thus offering the advantage of minimizing the number of devices required.

The POS device 104 may transmit purchase information or transaction details to the payment system 120, which may include a payment amount for a purchase being made at the POS device 104, merchant identifier or other information, product information, tax information, date, time, and the like. The purchase information may be transmitted to the payment system 120 over a network, such as the Internet, telephone line, and the like. Along with sending purchase information, the POS device 104 may request a transaction identifier from the payment system 120. A transaction identifier may be transmitted from payment system 120 to POS device 104 via the network connection. The transaction identifier may comprise an alphanumeric code that is associated with the purchase information and that represents the transaction pending at the POS device between the merchant and the customer. POS device 104 may convert the transaction identifier into a barcode that may be displayed on display 107 and/or may wirelessly transmit the transaction identifier from scanner device 106 and/or another device. The transaction identifier may be captured by a wireless device 102 of the user via NFC, a camera (e.g., photograph), and/or any other means. The user's wireless device need not include hardware specifically designed to interact with scanner device 106 (i.e., a customer may use a pre-existing wireless device). For example, wireless device's having camera capabilities are already widely available. These wireless devices are already likely interoperable with scanner device 106. Thus, a user need not purchase a new wireless device in order to perform the commerce methods described herein.

Payment system 120 is also communicatively coupled with one or more payment service provider systems 140, which may be the merchant's acquiring bank. The payment system 120 may query the payment service provider system 140 to determine if the merchant can accept wireless payments as described herein. The payment system 120 may also transmit authorization requests to the payment service provider system 140, such as when a credit card is used, and receive authorization for specific transactions from the payment service provider system 140. The payment service provider system 140 may operate with issuing banks 150B and merchant banks 150A to transfer funds to pay for purchased goods and/or services, and to authorize credit card or other transactions. In some embodiments, the payment system 120 may operate in place of payment service provider system 140 to settle transactions (e.g., credit transactions, debit transactions, and the like), thus, payment system 120 may directly operate with issuing banks 150B and merchant banks 150A offering improvements in efficiency by minimizing resources. Likewise, in other embodiments, such as when the payment system 120 manages a prepaid account for the customer, the payment system 120 may operate directly with the merchant bank 150A to settle a transaction.

The payment system 120 is also communicatively coupled with e-commerce systems 130, such as online money transfer services (e.g., PayPal). Payment system 120 is capable of sending payment authorization requests to e-commerce system 130 and receiving authorization to use the online money transfer services during a transaction. For example, payment system 120 may route purchase information (e.g., payment amount, customer PayPal account information, merchant PayPal or other account information, and the like) to PayPal to determine if PayPal's service may be used to complete the transaction and/or whether the customer's PayPal account may be debited for the transaction amount. Payment system 120 may communicate with PayPal to provide the customer's password, shipping, and/or other information. Payment system 120 may also transmit payment requests to e-commerce system 130 (e.g., PayPal) after a purchase transaction is completed to effect a transfer of funds to the merchant's account.

Payment system 120 may also be communicatively coupled with one or more databases 138 that store information about the customer (i.e., user profile information), such as payment account information, shipping information, and the like. Database 138 may also represent a user profile stored on a cloud network. Payment system 120 may access the user's profile on the cloud network 138 during a payment transaction. Coupon information and/or other information (e.g., rebate information, promotional information, prepaid account information, buy one or more get one information, and the like) may also be stored in database or cloud network 138. During a transaction, payment system 120 may access a user's profile stored on database or cloud network 138 to determine a default payment account for the customer and/or whether the customer has any coupons or rebates that may be applied to goods or services being purchased. Account information, such as the user's checking account balance and/or number, prepaid account balance, credit card account balance and/or number, and the like, may be transmitted to the customer for review and/or authorization to proceed with the transaction. The customer may confirm the use of an account, such as the default account, select an alternative account from the user profile, and/or provide additional account information to use to complete the transaction.

Payment system 120 may also be communicatively coupled with a computation device 134, such as the user's laptop or personal computer. The user may access the user's profile using device 134 to add funds to a prepaid account, change user profile setting (e.g., shipping and/or billing address, email address, phone number, and the like), change a default payment account, establish one or more preferences, such as paying for certain items with a specific account, change security verification information (e.g., password, authentication questions), and the like. The user may also add coupon information to the user profile, such as by downloading coupons to the user profile, uploading coupon barcodes or images, manually entering coupon information or barcodes, and the like.

Computation device 134 may also display one or more websites to the user, which may advertise goods or services, barcodes, and/or transaction identifier that may be captured by wireless device 102.

Payment system 120 is also communicatively coupled with a wireless carrier 110 that provides communication with wireless device 102. Data may be relayed between wireless device 102 and payment system 120 via wireless carrier 110. For example, the transaction identifier may be sent from wireless device 102 to payment system 120 via wireless carrier 110. Likewise, confirmation messages, authorization requests, password requests, and the like may be transmitted from payment system 120 to wireless device 102 via wireless carrier 110. As described previously, wireless device 102 may capture the transaction identifier from POS device 106. For example, a camera (not shown) of wireless device 102 may capture an image of a barcode displayed on display 107 of scanner device 106. Wireless device 102 may then convert or decipher the barcode to obtain the transaction identifier, which may then be relayed to payment system 120 via wireless carrier 110. Alternatively, wireless device 102 may capture the transaction identifier from POS device 104 and/or scanner 106 via NFC, Bluetooth, or via any other wireless communication and transmit the transaction identifier to payment system 120. Transmission over wireless carrier 110 may be performed via GPRS, G3, mobile internet, and the like.

In some embodiments, payment system 120 may generate a barcode from the transaction identifier and transmit the barcode to POS device 104. Wireless device 102 may capture the barcode from POS device 104 and transmit the barcode to payment system 120 without converting or deciphering the barcode. This minimizes the number of process steps required at the wireless device, and thus advantageously minimizes computational demand on the wireless device. This approach also advantageously means the user devices is not required to be specially adapted for deciphering. Payment system 120 may then convert or decipher the barcode received from wireless device 102 to determine the pending transaction associated with the barcode and transaction identifier.

Figure 2:
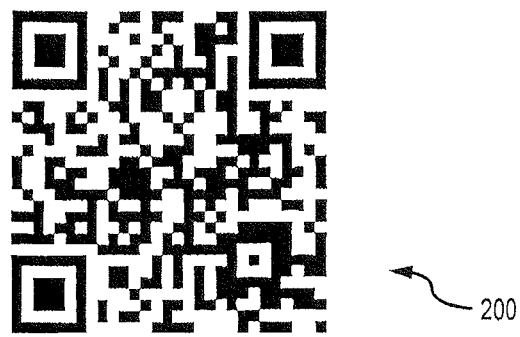
FIG. 2 illustrates a matrix barcode and specifically a QR code that may be displayed on a merchant point of sale device according to an embodiment of the present invention.

FIG. 2 illustrates an embodiment of a barcode 200 that may be displayed on display 107. Barcode 200 may be generated from a transaction identifier and may represent an alphanumeric code associated with a pending transaction. Wireless device 102 may capture barcode 200 using a camera or scanner and convert or decipher barcode 200 to obtain the transaction identifier. Barcode 200 may be a matrix barcode (e.g., two dimensional barcode), such as the QR code displayed in FIG. 2 or may be any other type of barcode. One advantage of matrix barcodes, such as QR code 200, is the ability to store large amount of data that may be easily decipherable by a wireless device, such as a mobile or cell phone.

Figure 3:
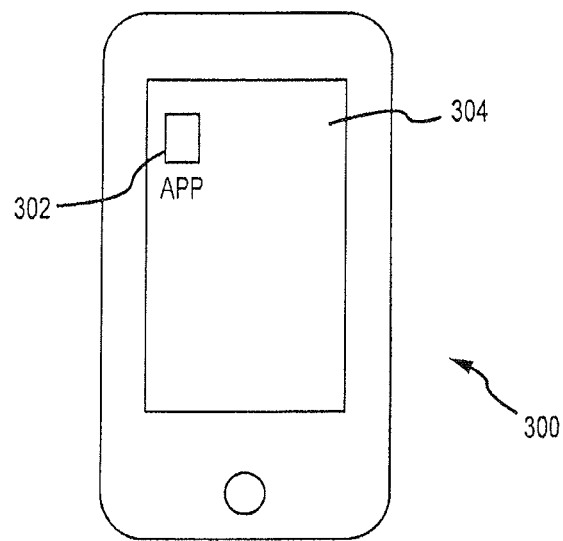
FIG. 3 illustrates a wireless device having a payment system application software according to an embodiment of the present invention.

FIG. 3 illustrates an embodiment of a wireless device 300, which may be used to perform the payment transactions described herein. Wireless device 300 may include a mobile or cell phone, a personal digital assistant (PDA), a tablet computer (e.g., iPad®), and the like. Wireless device 300 may include a camera (not shown) capable of capturing images of barcodes, such as QR code 200, and/or may include a scanner (not shown), which is capable or reading barcodes, such as QR code 200. Wireless device 300 may include application software 302, or simply an app, that may be executed to perform the payment transactions described herein. For example, the user may select app 302 from a touch screen display 304 of wireless device 300, which may initiate a camera or scanner (not shown) of wireless device 300. The user may then capture barcode 200 using the camera or scanner and app 302 may convert or decipher the barcode to obtain the transaction identifier. App 302 may automatically transmit the transition identifier to payment system 120 for processing. The transaction identifier may be automatically routed (i.e., without user involvement) to payment system 120 to simplify the process and since the transaction identifier may not represent any meaningful data to wireless device 102. In other embodiments, app 302 may query the user about whether to send the code and may send the code when an authorization is provided by the user.

In some embodiments the user may select a pre-photographed/scanned barcode (i.e., previously captured barcode) and then select app 302, or vice versa, to convert or decipher the pre-photographed/scanned barcode 200. If the deciphered barcode 200 represent an alphanumeric code having a proper format, the alphanumeric code may be automatically transmitted to payment system 120.

Figure 4:
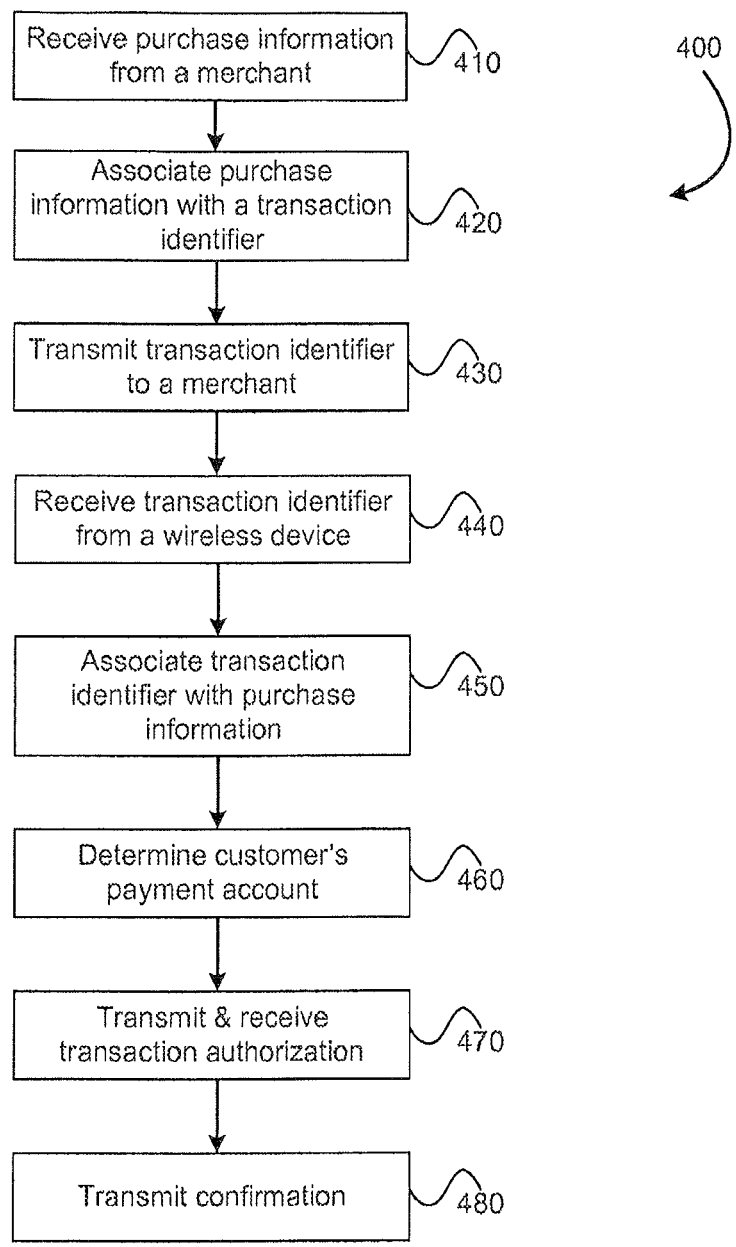
FIG. 4 illustrates a method for performing a payment transaction using a wireless device according to an embodiment of the present invention.

FIG. 4 illustrates one embodiment of a method 400 for performing a wireless payment. At block 410, purchase information is received at the payment system from a merchant. The purchase information may include information about one or more goods or services to be purchased by a customer and may include information about the merchant, such as a merchant id or code, a physical address, account information, and the like. The purchase information may also include a request for a transaction identifier that represents the purchase. At block 420 the payment system associates the purchase information with a transaction identifier, such as a unique alphanumeric code that represents that purchase information. At block 430, the payment system transmits the transaction identifier to the merchant. In some embodiments, a device at the merchant location, such as a POS device, may generate a machine readable code (e.g., a matrix barcode, QR code, and the like) that encodes the information of the transaction identifier (e.g., the alphanumeric code). The machine readable code may then be displayed on a device at the merchant location so that an image of the machine readable code may be captured by a customer's wireless device. In other embodiments, the transaction identifier (e.g., alphanumeric code) may be wirelessly transmitted from the merchant's device to the customer's wireless device, such as via NFC, Bluetooth, and the like. Capturing the machine readable code from the POS device provides the advantage that no customer information (e.g., account information, personal information, PIN number, and the like) is passed from the consumer to the merchant, thereby eliminating the risk of fraud that may be present in conventional wireless device transactions where such information is passed from the wireless device to the merchant. The methods of capturing the transaction identifier described herein enable a new commerce method and provide interoperability between already widely available merchant and consumer devices.

Alternatively, the processes and/or sequence of processes described in blocks 410-430 may be changed or slightly modified so that one or more transaction identifiers are cached or stored on the POS device as described above. The POS device may then convert a transaction identifier into machine readable code and display or provide the machine readable code to a customer without having to establish a connection with the payment system. The POS device may associate the transaction identifier with the purchase information and send this information (e.g., the purchase information and corresponding transaction identifier) to the payment system.

At block 440, the payment system receives the transaction identifier from the customer's wireless device. The transaction identifier may be received from the wireless device via General Packet Radio Service (GPRS), $3^{rd}$ Generation Mobile Telecommunications (3G), mobile internet, Short Message Service (SMS), Multimedia Messaging Service (MMS), Unstructured Supplementary Service Data (USSD), and the like. The customer's wireless device may obtain the transaction identifier by converting, interpreting, or deciphering the machine readable code (e.g., QR code) if an image of the machine readable code is captured by the wireless device, or the wireless device may simply transmit the transaction identifier if the transaction identifier is received via wireless transmission from the merchant device. The transaction identifier and method involving the transaction identifier described herein provides improved efficiency since the same transaction that the payment system associated with the purchase information is subsequently provided to the payment system. Further, the transaction identifier and methods described herein provide a simple commerce method since required user input is minimized and/or virtually eliminated because the payment system, merchant system, and/or wireless device perform nearly all operations.

At block 450, the payment system associates the transaction identifier received from the wireless device with the purchasing information received from the merchant so that the payment system may determine which pending transaction the customer wishes to complete. At block 460, the payment system determines a payment account associated with the customer. The payment account may be a default account specified on the customer's user profile stored on a cloud network or may be an account selected by the customer and transmitted to the payment system. Such selection may occur via app 302, which may display the different payment accounts available for selection and transmit account information to the payment system for the selected account. The customer may select from among a plurality of accounts displayed on the wireless device and stored on the cloud network, or the customer may manually enter account information into the wireless device, which may be transmitted to the payment system. In some embodiments, the payment system prompts the customer for a selection of an account, such as when a default account is not specified or when the customer's user profile does not include account information. The customer may also override the use of a default account and select a new account to use.

In some embodiments, the payment system transmits an authorization request to a payment service provider system to provide funds for the payment transaction (block 470). In other words, the payment system sends a request to an acquirer to determine if funds will be provided from the customer's account to pay for the pending purchase transaction. The payment system then receives an authorization from the payment service provider system indicating that the transaction has been authorized and that funds will be provided for the pending purchase transaction (block 470). In other embodiments, the payment system may function in a capacity similar to the payment service provider to authorize the purchase transaction in which case the authorization request is transmitted from the payment system to an issuing bank and the authorization is received from the issuing bank indicating that funds are available for use by the customer. At block 480, a confirmation of the authorization received from the payment service provider is transmitted to the merchant to confirm that funds will be provided to pay the merchant. The merchant may then transfer one or more goods or services to the customer. The pending purchase transaction may then be settled through the payment service provider, issuing bank, and merchant bank or through the payment system if the payment system is functioning in a capacity similar to the payment service provider. To settle the pending purchase transaction, the payment system may transmit a request to the payment service provider system to provide funds to the merchant to pay for the purchased goods and/or services.

In other embodiments, the authorization and settlement may occur through an e-commerce system, such as an online money transfer system (e.g., PayPal). In such embodiments, the method 400 may additionally include the payment system querying the user for an e-commerce system username and/or password (e.g., PayPal username and/or password) or this information may be stored on the customer's user profile. The payment system then transmits the username and/or password to the ecommerce system and receives an authorization that indicates funds are available for use. The payments system may also receive an account balance from the ecommerce system, which may be displayed to the customer prior to completing the transaction. Settlement may occur through the ecommerce system providing funds to the merchant's account or accounts.

The method 400 may also include the payment system transmitting a payment authorization request to the wireless device after the payment system receives the transaction identifier from the wireless device. The payment authorization request may identify the merchant, an amount of the payment transaction, and/or the goods or services being purchased. The payment system may receive a confirmation from the wireless device to continue with the payment transaction. This process may be used as a verification to ensure that the customer desires to pay for the goods or service using the wireless device and to ensure that the customer is the individual requesting payment and not someone else. The payment authorization request may also include or display an amount of funds available to use from the selected payment account. The customer may then determine whether to use the selected payment account or select an alternative or additional payment account to use. In some embodiments, the payment system may transmit a payment transaction notification to the wireless device after the payment system receives the transaction identifier from the wireless device. The payment transaction notification may identify the merchant and an amount of the payment transaction. The payment transaction notification may be used as a verification to ensure that the customer is aware that the payment transaction is pending. The payment system may then complete the payment transaction or the customer may cancel the payment transaction, such as when the payment transaction is fraudulent. Such notification, verification, and/or authorization processes provide the advantage of improved security of wireless device transactions by ensuring that the customer is aware of pending or potential purchases including amounts, merchants, products/services, and the like, and/or involved in carrying out such purchases.

The method 400 may also involve the use of coupon in performing the purchase transaction. For example, the payment system may receive coupon information from the customer's wireless device. This information may be received well in advance of the transaction or may be received during performance of the transaction. The customer, using the wireless device, may capture an image of the coupon or coupon's barcode, scan the coupon, manually input coupon or barcode information, and the like. The payment system may store the coupon information in the customer's user profile until a good or service is identified as being represented by the coupon. When a good or service is identified, the payment system may associate the coupon information with good or service being purchased and may credit the customer with an amount of the coupon. In crediting the customer with the coupon amount, the payment system may send a coupon request to the manufacturer or issuer of the coupon and receive an authorization to credit the customer in the amount of the coupon, or the coupon may be stored centrally and the purchase details are checked against the coupon criteria. In addition, when the good or service is identified as being represented by the coupon, the payment system may transmit a reminder of the coupon to the customer's wireless device and inquire about whether the customer desires to use the coupon. The payment system may then receive a confirmation to use the coupon or may receive a denial requesting that the coupon not be used.

In some embodiments, the payment account includes a credit card account, a debit card account, a prepaid account, an ecommerce account (e.g., PayPal), a checking account, a savings account, and the like. The payment system that performs the method steps above may include a communication interface that allows the payment system to transmit and receive data, information, and communication to and from other systems; a memory device having instruction stored thereon; and a processor communicatively coupled with the memory such that the instructions stored on the memory cause the processor to perform the methods described herein.

Figure 5:
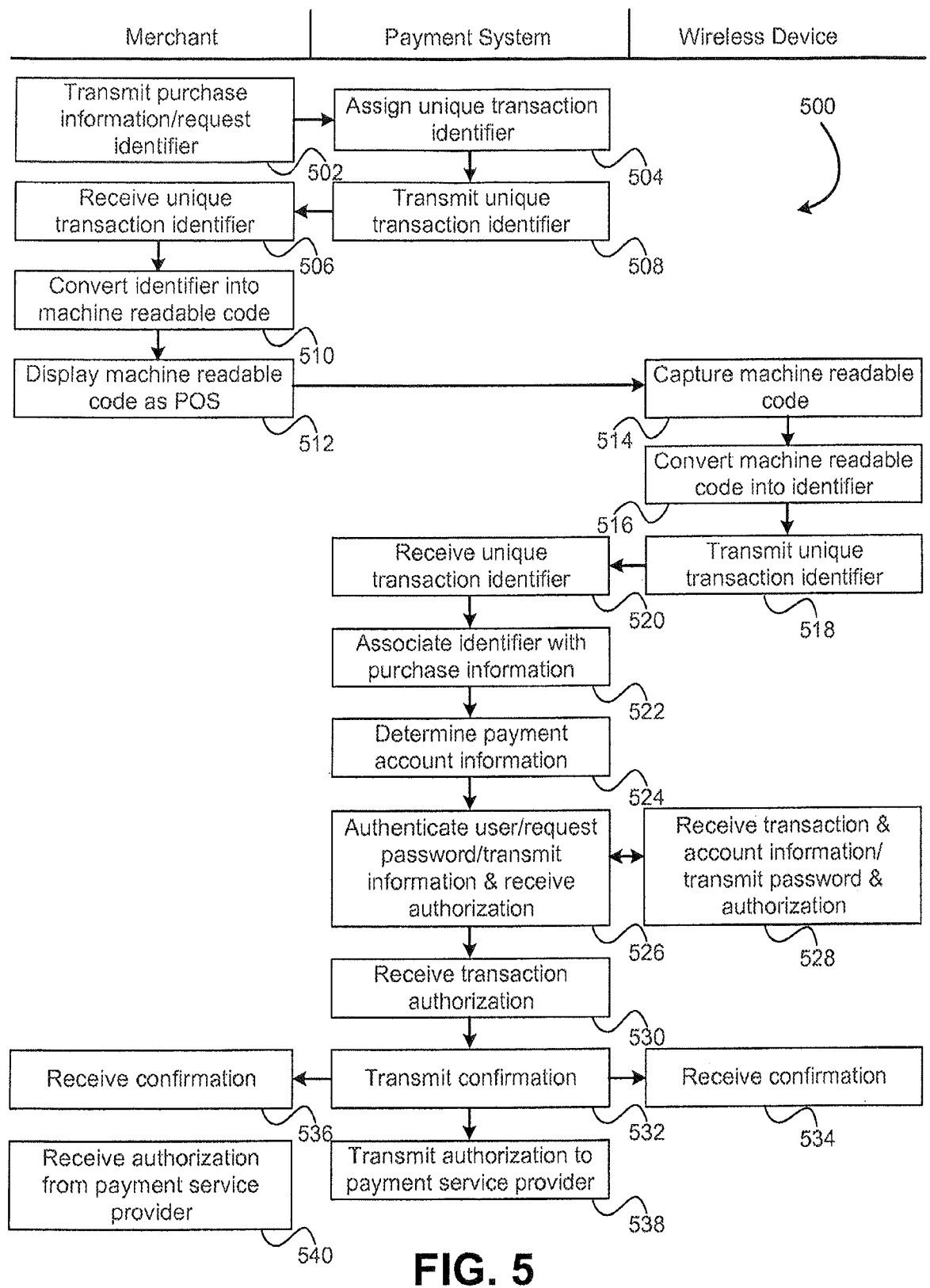
FIG. 5 illustrates another method for performing a payment transaction using a wireless device according to an embodiment of the present invention.

FIG. 5 illustrates another embodiment of a method 500 for performing a payment transaction using a wireless device. The method 500 illustrates processes that may occur at a merchant device, a payment system, and a customer's wireless device. It should be realized that the merchant may represent a physical merchant location, an online merchant, a kiosk, a vending machine, or any other merchant offering goods and/or services. At block 502, the merchant transmits transaction details (e.g., purchase information) and/or a transaction identifier request to the payments system. When the merchant is a physical location, an employee may enter purchase information into a POS device, such as by scanning products. The employee may then select a mobile payment method button that initiates communication with the payment system. The payment system may route a query to the merchant's payment provider to ensure that the merchant can accept payments (e.g., the payment system may query the party responsible for settling the transaction, such as the merchant's acquirer, an ecommerce system (PayPal), and the like). If the merchant is capable of accepting payments, the payment system accepts the transaction details from the merchant, otherwise the merchant's request is denied.

At block 504, the payment system assigns a unique transaction identifier (e.g., alphanumeric code) to the pending transaction. At block 508, the payment system replies back to the merchant device and provides the unique transaction identifier, which is received at the merchant device at block 506. In some embodiments, such as those where the wireless device photographs an image of a QR code, the merchant device converts the transaction identifier into a machine readable code. At block 512, the machine readable code is displayed on a display screen of the POS device, such as on a card reader screen. Alternatively, the machine readable code may be printed on a receipt or displayed in some other way. The customer may then present his or her wireless device (e.g., mobile phone, PDA, tablet computer, and the like) and select a payment system app, such as app 302. Selecting the app may initiate the camera or scanner of the wireless device. Alternatively, the unique transaction identifiers (or a plurality of unique transaction identifiers) may be cached on the POS device as described above.

At block 514, the wireless device may capture the machine readable code, such as by scanning/photographing and capturing an image of the machine readable code. Alternatively, the transaction identifier may be wirelessly transmitted from the POS device to the wireless device via NFC, Bluetooth, and the like. In some embodiments, the machine readable code is converted, interpreted, or deciphered into the transaction identifier at block 516. The conversion or interpretation may be performed by the app. At block 518, the transaction identifier is transmitted to the payment system, such as via GPRS, G3, mobile internet, and the like. At block 520, the payment system receives the transaction identifier from the wireless device (in some embodiments, the machine readable code may be generated by the payment system, transmitted to the merchant, and received from the wireless device in which case the machine readable code is converted by the payment system into the transaction identifier). The app may transmit the identifier automatically after capturing the machine readable code (or transaction identifier) and converting the code into the transaction identifier. In such embodiments, the customer's only participation up to this point may be selecting the app and operating the wireless device's camera/scanner or positioning the wireless device in a location sufficient to receive the NFC, Bluetooth, etc. transmission. In other words, the customer need not be actively involved in performing the purchase transaction other than a few minor inputs. Thus, this simplified and efficient method provides for improved user interaction.

At block 522, the payment system associates the transaction identifier with the pending purchase transaction to determine that the customer wishes to complete the transaction pending at the merchant. At block 524, the payment system may determine payment account information to use to complete the transaction, such as a default payment account identified on the customer's user profile stored on a cloud network. As described herein, the customer can specify other accounts to use, manually enter account information, and the like.

At block 526 and 528, the payment system may communicate with the wireless device to receive a variety of additional information, receive an authorization to proceed with the transaction, authenticate the customer, and the like. For example, the payment system may transmit details of the pending transaction to the wireless device so that the customer can verify that the payment system has associated the transaction identifier with the correct pending transaction. Such transaction details may include, an identification of the merchant, the transaction amount, the goods and/or services being purchased, and the like. The customer may transmit a confirmation message to the payment system to confirm that the purchase transaction is correct and authorize to continue with the transaction or may indicate that the purchase transaction is wrong, in which case the process could be repeated. The transaction details may also include an indication of the default account to use or may include a listing of a plurality of accounts (stored on the user profile) that the user may select from. The customer may confirm to use the default account, select another account to use (or select an account to use if a default account is not specified), enter in account information to use, and the like. The payment system may also transmit account balance information for one or more of the plurality of accounts so that the customer may determine which account to use. In some embodiments the customer may select multiple accounts to use and designate an amount to use from each account.

The payment system may also communicate with the wireless device to authenticate the customer. For example, the payment system may request that the customer enter a PIN or other password on the wireless device or may request that the customer provide a biometric identification (e.g., fingerprint, retinal scan, facial scan, and the like). The payment system may also determine a location of the merchant and a location of the wireless device (e.g., via GPS) and verify that they are substantially in the same location. An additional or alternative authentication may involve transmitting an out of band authentication message to the wireless device via an alternative communication channel (e.g., Unstructured Supplementary Service Data (USSD) and the like) and receiving a confirmation response via the same or a different channel to enact a two factor authentication. The payment system may select the customer authentication method based on the amount of the transaction so that small transaction amounts require little or no authentication whereas large amounts require extensive or strict authentication. The amount of authentication that is required may be driven from a number of factors including: merchant profile, transaction amount, authentication requirements as defined by the customer's payment account, and the like. The various authentications may include a 4-6 digit pin, an individual number within the pin, a password, a USSD/SMS message, and the like. This offers advantages of improved user interaction and minimizing user input depending on the context of the transaction.

An example of the communication between the payment system and the wireless device in blocks 526 & 528 may involve the customer selecting a payment service provider such as PayPal for example as the payment option. In response to that selection, the payment system may route the customer's PayPal user details and the amount to be debited to PayPal. PayPal may confirm that the customer is a PayPal user and that the account may be used to pay for the pending transaction. PayPal may request that the payment system provide the customer's password. The payment system may query the customer for this information and route the password back to PayPal. The payment system may also determine one or more security authentication to use depending on the purchase amount. Thus, the payment system may transmit a USSD message to the wireless device and continue with the transaction when a response is received. If no response is received or if the response is inadequate, the payment system may end the transaction.

After information has been exchanged in blocks 526 & 528 (if necessary), the payment system may receive an authorization for the transaction at block 530, such as from a payment service provider system, e-commerce system, and the like as described herein. At block 532, the payment system transmits a confirmation message to the merchant and/or wireless device, which may be received at blocks 536 & 534, respectively. The confirmation message confirms that the transaction has been authorized and that funds will be provided to pay for the pending transaction. In some embodiments, the payment system then sends an authorization message to the payment service provider system that instructs the payment service provider to settle the pending transaction. In such embodiments, the merchant may receive a transaction authorization message from the payment service provider (block 540) that confirms that funds will be provided. In other embodiments the payment system may function in a settlement capacity and the payment service provider system is not needed.

Additional embodiments of the invention may include using both a machine readable code and wireless transmissions to complete a payment transaction. For example, the wireless device may be used to photograph images of coupon barcodes as described herein and may be used to receive the transaction identifier via NFC, Bluetooth, and the like. Thus, a combination of the embodiments described herein may be employed and the invention need not be limited to the embodiments described herein.

Figure 6:
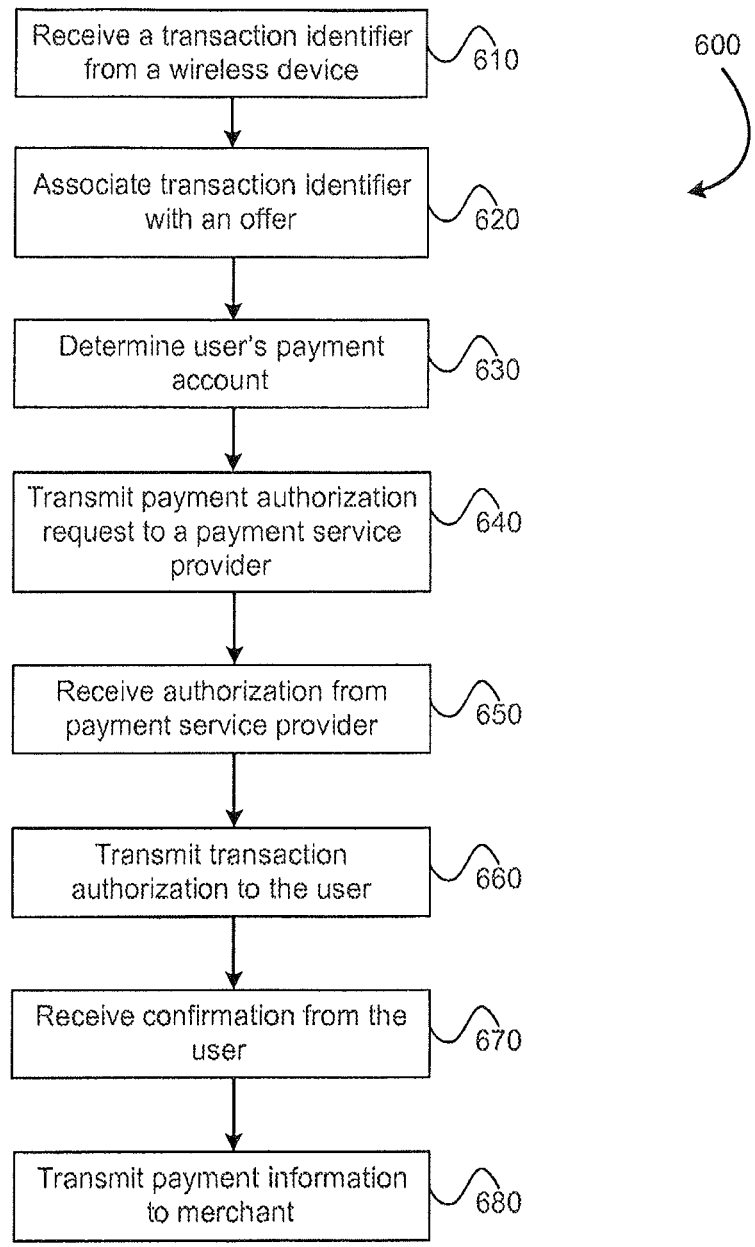
FIG. 6 illustrates another method for performing a payment transaction using a wireless device according to an embodiment of the present invention.

FIG. 6 illustrates an additional embodiment of a method 600 for performing an electronic transaction. Method 600 is particularly useful for situations that do not involve a physical merchant location, such as when items are being purchased directly from magazine or television advertisements and thus there is minimal or no customer-merchant interaction. At block 610, a transaction identifier is received at the payment system from a wireless device associated with a user. The transaction identifier may be obtained by the wireless device upon the wireless device receiving readable code and interpreting the readable code and/or receiving a wireless communication as described herein, for example, the user photographing a barcode displayed in a magazine, on a television advertisement, or on a webpage. The readable code may be obtained from any of the following sources: magazine, a periodical, a book, a vending machine, a television screen, a movie screen, a computer screen, a billboard, a POS device, an advertisement, and the like. At block 620, the payment system associates the transaction identifier with one or more goods or services offered and/or advertised by a merchant.

At block 630, the payment system determines payment account information associated with the user. At block 640, the payment system transmits a payment authorization request to a payment service provider's system to provide funds for payment of the one or more goods or services. In other embodiments, the payment authorization request is transmitted to an e-commerce system (e.g., PayPal) or the payment system functions in a capacity similar to a payment service provider and the authorization request is sent to an issuing bank or the customer's bank. In still other embodiments, a user's prepaid account is used, which may be managed by the payment system, and an authorization request message is not necessary. At block 650 (if necessary), the payment system receives, from the respective system (e.g., payment service provider system, e-commerce system, and the like), an authorization to provide funds for the payment transaction. At block 660, the payment system may optionally transmits a transaction authorization request to the wireless device to verify and/or authorize the transaction. At block 670, the payment system receives a confirmation from the wireless device to authorize the transaction, if necessary. At block 680, the payment system transmits payment information to the merchant to effect a transfer of the one or more goods or services to the customer. The payment information transmitted to the merchant may include a shipping address of the customer, which may be stored on a user profile on a cloud network.

The method 600 may be used to purchase goods and/or service directly from television, webpage, magazine, etc. advertisements. To purchase such goods or services, the consumer merely needs to capture an image of the advertisement, such as by photographing or scanning a barcode, or using software to recognize the advertisement of the product that is being sold, and confirming the purchase. The payment system may perform all or a portion of the other payment processes, such as authorization, settlement, shipping confirmation (e.g., providing shipping details), and the like, thereby optimizing efficiency in the system by centrally performing transaction processes eliminating the need for additional user input or action. The process may be further simplified by removing the user confirmation requirement, such as for purchases with low transaction values, so that the user merely needs to photograph an advertisement (e.g., barcode or advertisement image) and wait for a product or service to be delivered. Such direct transactions may greatly enhance commerce and provide the advantage of improved efficiency in commerce by minimizing the number of steps required by the user.

Figure 7:
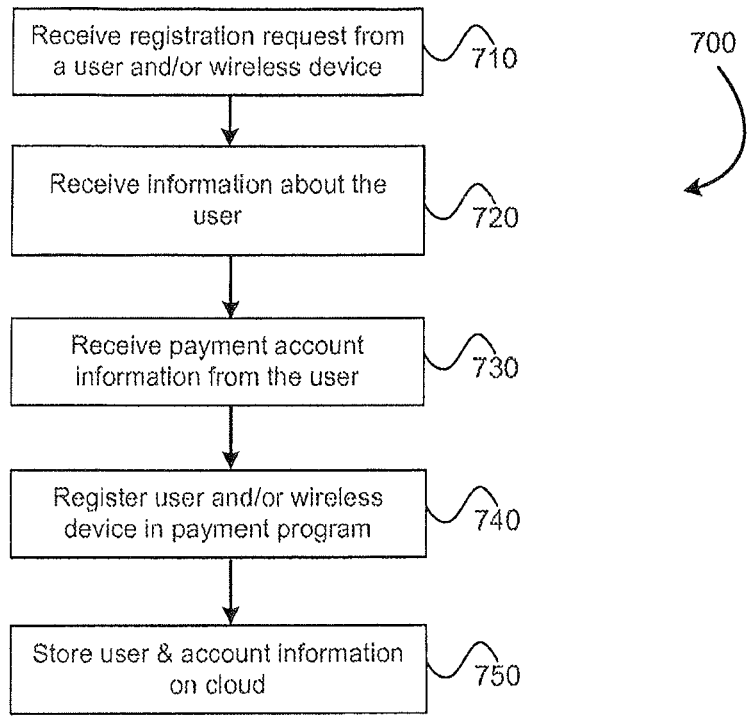
FIG. 7 illustrates a method for registering a wireless device in a payment service according to an embodiment of the present invention.

FIG. 7 illustrates an embodiment of a method for registering a user with a payment service of a payment system. At block 710, the payment system receives a registration request from the user. At block 720, the payment system receives information about the user of the wireless device, which may include: a shipping address, an email address, a telephone number, a wireless device identifier (e.g., MSISDN number), a billing address, a user identifier, a wireless device application (e.g., smart phone app) identifier, and the like. At block 730, the payment system receives payment account information from the user, which may include: information about a credit card, a debit card, a checking account, a savings account, an e-commerce account (e.g., PayPal username and/or password), a prepaid account, and the like. The payment account information may also include a designation of a preselected or default account from among the plurality of accounts. At block 740, the payment system registers the user in the payment service program. At block 750, the user's personal and account information is stored on a cloud network and/or on a database. The registration method 700 may be performed prior to the user performing a payment transaction with the wireless device or may occur during the payment transaction. In some embodiments, registering the user with the payment service of a payment system includes registering the wireless device with the payment service or registering an application of the wireless device with the payment service. Likewise, in some embodiments, the user registration and/or information provided by the user is transmitted or provided to the payment system via the wireless device, so that the registration process is performed via the wireless device. In other embodiments, the registration process is performed via a device or system other than the wireless device, such as a laptop or personal computer and/or via one or more networks, such as the Internet.

Figure 8:
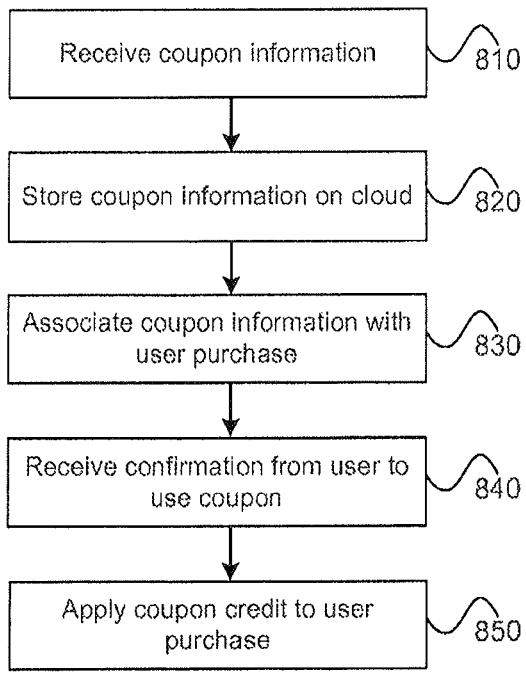
FIG. 8 illustrates a method for receiving coupon information that may be used in performing payment transactions according to an embodiment of the present invention.

FIG. 8 illustrates an embodiment of a method 800 for receiving coupon information at the payment system. At block 810, the payment system receives coupon information from a user's wireless device (or from a personal computer or other device). The coupon information may be input into the wireless device as described herein (e.g., using a camera, scanning, manual input, email, download, wireless communication (e.g., NFC, Bluetooth), and the like). At block 820, the payment system stores the coupon information on the user's profile on a cloud network or database, which provides the advantage of increasing commerce efficiency by eliminating the need for the user to retain a physical copy of the coupon. At block 830, the payments system associates the coupon information with one or more goods or services being purchased by the user in a pending transaction with a merchant. The payment system may automatically associate the coupon information with the good(s) and/or service(s) being purchased without requiring input from the user, thereby providing the advantage of increased commerce efficiency by eliminating the need for the user to remember that the user possesses a coupon corresponding to the good(s) and/or service(s) being purchased. Block 830 may be optional depending on whether the user or the payment system selects to use the coupon. At block 840, the payment system receives a confirmation from the user to use a selected coupon. The user can select the coupon from the user's profile and request the payments system to use the coupon, or the payment system may select the coupon and query the user about whether to use the coupon. At block 850, the payment system applies the coupon to the pending purchase transaction so that the user is credited with an amount of the coupon value.

In some embodiments, the transaction identifiers described herein (i.e., the QR codes and the like) may be used in a money withdrawal transaction. In such embodiments, the transaction identifier may be a randomly generated alphanumeric code or number that is not associated with any particular transaction, or may be a randomly generated alphanumeric code that is associated with a geographic identifier or location of an ATM or other funds dispensing device. The funds may be dispensed from the funds dispensing device, such as an ATM (hereinafter ATM device). The money withdrawal transaction may use existing procedures and systems of the ATM device or other funds dispensing device. For example, a user's primary account number (PAN), bank identification number (BIN), and/or personal identification number (PIN) may be routed through the ATM payment system as in conventional money withdrawal processes. The transaction identifier may be used as a means of routing the PAN/BIN to the ATM device so that the PAN/BIN and PIN may be subsequently routed from the ATM device for authorization of withdrawal of funds from the ATM device. Stated differently, the transaction identifier and money withdrawal transaction described herein may be an alternative means of sending card data (i.e., PAN, BIN, and the like) to the ATM device so that the remaining procedures employed in a money withdrawal transaction (i.e., entry of the PIN, withdrawal amount, and the like) are similar to those currently used in existing ATM systems.

One advantage of using existing systems is that a mobile device used in the money withdrawal transaction need not be authenticated to complete the transaction. Rather, the mobile device may merely be used as a tool to route information to the ATM device to allow the ATM device to be used as in conventional money withdrawal procedures. Another advantage of using the money withdrawal transaction described herein is the elimination or reduction of the risk of card skimming, or in other words the stealing of account information from a debit or credit card that is swiped through a card reader of the ATM device.

The money withdrawal transaction may be an alternative transaction to those currently used in ATM systems. For example, a user may have the option to swipe a debit or credit card and enter a pin into the ATM device as is commonly done, or the user may have the option of capturing a transaction identifier (i.e., QR code and the like) that is displayed on or provided from the ATM device, and using the transaction identifier to send card data and/or other information to the ATM device so the money can be withdrawn therefrom. In some embodiments, the ATM device may have been provided with a transaction identifier during completion of a prior money withdrawal transaction so that when a user approaches the ATM device, the user is able to either instantly see and capture the transaction identifier from the ATM device, or swipe a debit or credit card with a card rear of the ATM device. The transaction identifier may be transmitted along with an authorization message during completion of a previously pending money withdrawal transaction, or may be provided with any other electronic transmission. In other embodiments, a batch of transaction identifiers may be provided to the ATM device at one or more predetermined periods of time, such as daily, weekly, or whenever it is determined that a number of transaction identifiers is insufficient. In yet another embodiment, the transaction identifiers could be sent to a bank or payment post and subsequently routed to the ATM device.

Figure 9:
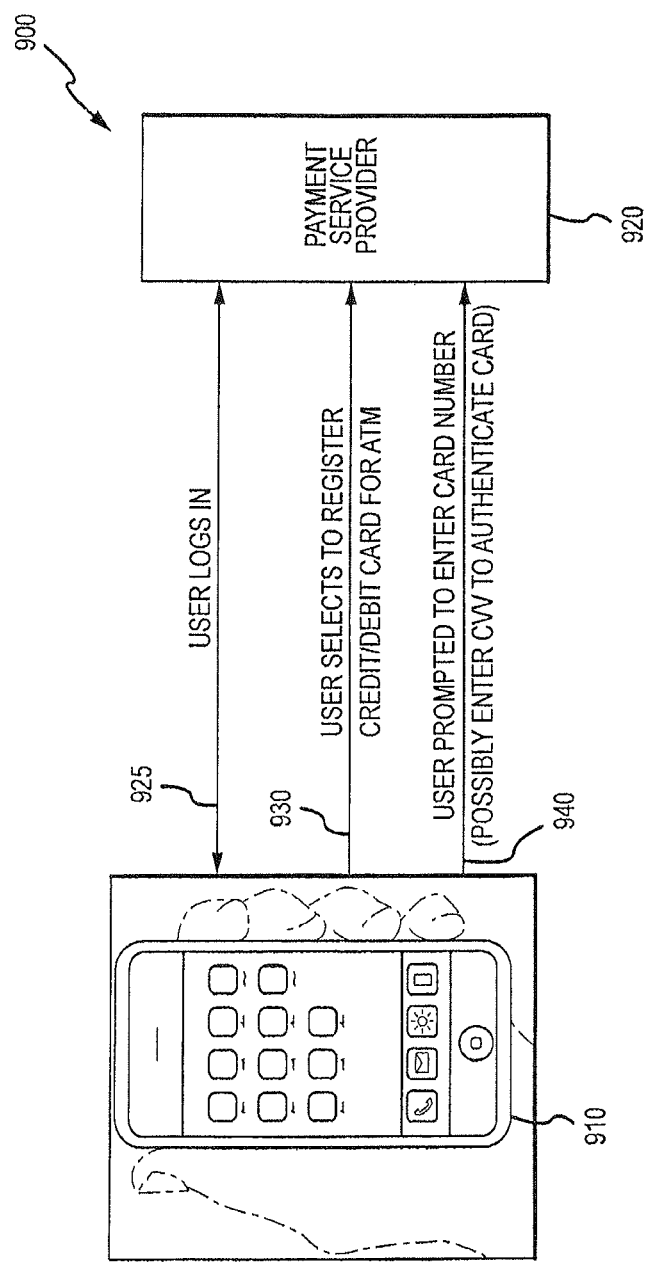
FIG. 9 illustrates an embodiment of registering a mobile device with a payment service provider to allow the mobile device to perform a money withdrawal transaction according to an embodiment of the present invention.

Referring now to FIG. 9, illustrated is an embodiment 900 of registering a mobile device 910 with a payment service provider 920 in order to allow the mobile device 910 to perform the money withdrawal transactions described herein. In some embodiments, the mobile device 910 may download an application (hereinafter APP) as part of a registration process. The APP of mobile device 910 may allow the user to easily select and execute a money withdrawal transaction. As shown in FIG. 9, at step 925 a user logs into a system of the payment service provider 920 in order to register the mobile device 910 the payment service provider.

At step 930, the user selects to register a presentation instrument (hereinafter debit or credit card) for subsequent use in withdrawing funds from an ATM device. The user may select to enter multiple debit or credit cards with payment service provider 920 so that upon selecting a money withdrawal transaction, the user is presented with the option of selecting one of multiple debit or credit cards for use in the withdrawal transaction. At step 940, the user may be prompted to enter various information associated with the debit or credit card selected for registration with the payment service provider 920. For example, the user may be prompted to enter the card number (i.e., PAN), the card verification value (CVV), the expiration date, and the like. The payment service provider 920 may create an account for the user and store this data in the account on one or more databases. The account may be subsequently used in a money withdrawal transaction as described herein. Using the APP, the user may subsequently add information to their account and/or delete information therefrom, such as deleting one or more debit or credit cards from the account.

Figure 10:
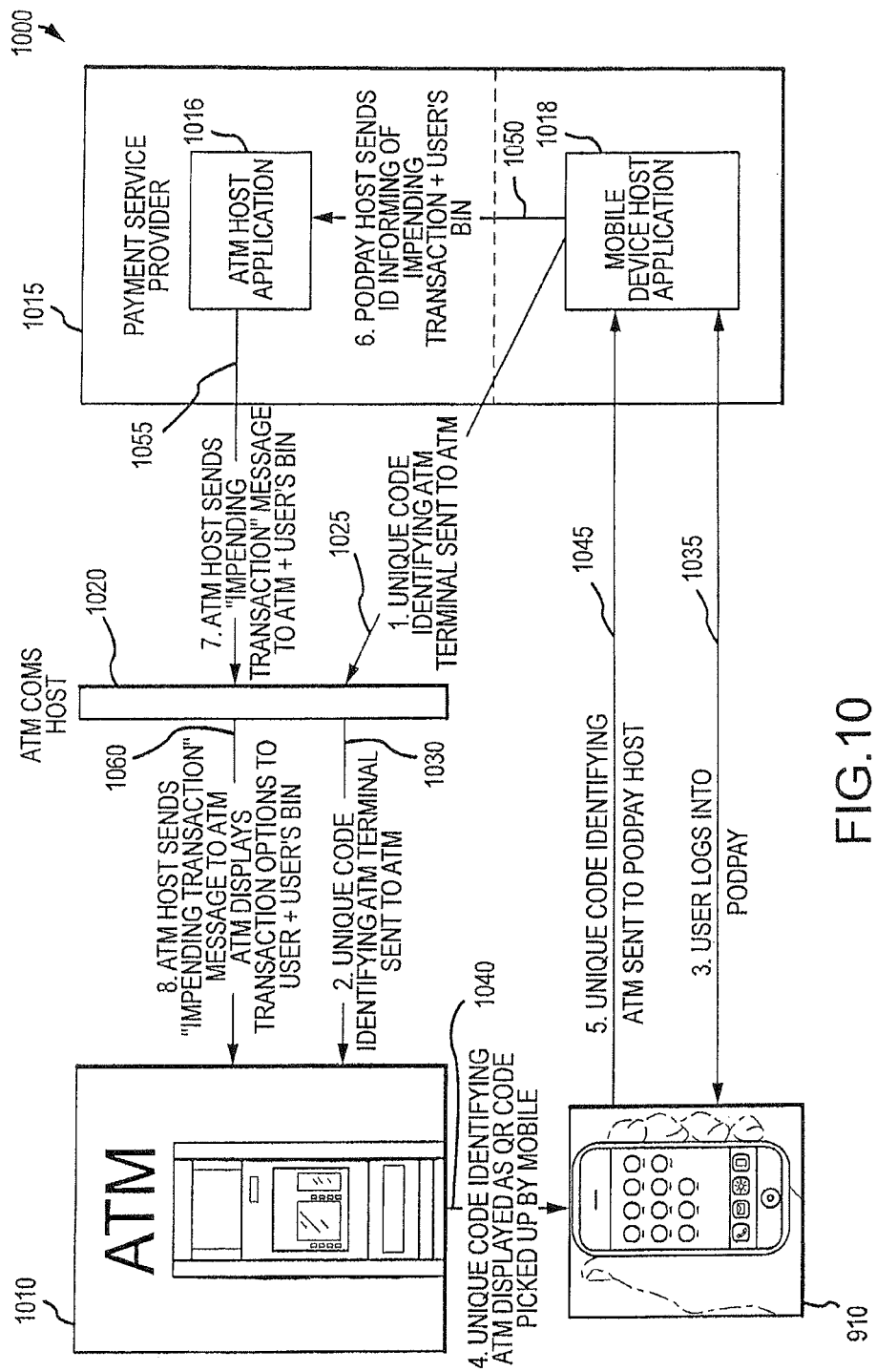
FIG. 10 illustrates an embodiment of using a mobile device to perform a money withdrawal transaction at a funds dispensing device according to an embodiment of the present invention.

Referring now to FIG. 10, illustrated is an embodiment 1000 of using a mobile device 910 to perform a money withdrawal transaction from an ATM device 1010. As shown in FIG. 10, a payment service provider 1015 may include a first subsystem 1016 (the hereinafter ATM host application 1016) and a second subsystem 1018 (hereinafter mobile device host application 1018) that are used to communicate with the mobile device 910 and/or ATM device 1010 in performing the money withdrawal transaction. In some embodiments, the ATM host application 1016 and mobile device host application 1018 may be subsystems that are operated by the same payment service entity, or may be subsystems of different payment system entities that communicate and/or operate with one another to perform the money withdrawal transaction.

To perform the money withdrawal transaction, at step 1025 a unique transaction identifier or code may be routed to the ATM device 1010 from the mobile device host application 1018. To route the unique transaction identifier or code to the ATM device 1010, the mobile device host application 1018 may be provided with a geographic identifier of the ATM device 1010. The mobile device host application 1018 may generate the unique transaction identifier and associate the unique transaction identifier with the geographic identifier of the ATM device 1010. In some embodiments, the transaction identifier is a randomly generated alphanumeric code that is associated with the ATM's geographic identifier. This association may be stored on one or more databases (not shown) that are communicatively coupled with the mobile device host application 1018 for subsequent use by the mobile device host application 1018. In some embodiments, an additional communications system 1020 may be used to route information to and/or receive information from ATM device 1010. For example, at step 1030 the unique transaction identifier may be routed from communication 1020 to ATM device 1010.

At step 1035, the user may log into the payment service provider 1015 via the APP on mobile device 910 in order to perform a money withdrawal transaction. In some embodiments, the APP of mobile device 910 may include a button that triggers or initiates the money withdrawal transaction. At step 1040, the mobile device 910 may capture the transaction identifier previously provided to ATM device 1010 in steps 1025 and/or 1030. As described herein, the transaction identifier may comprise a QR code that is displayed on ATM device 1010. The mobile device 910 may capture the QR code by photographing or scanning an image of the QR code displayed on ATM device 1010. In other embodiments, the transaction identifier may be wirelessly transmitted from ATM device 1010 to mobile device 910, such as via Bluetooth, NFC, and the like.

At step 1045, the transaction identifier is routed or transmitted to mobile device host application 1018 from mobile device 910. The transaction identifier may be routed to the mobile device host application 1018 along with one or more other pieces of information, such as geographic location information of ATM device 1010, information that identifies the mobile device 910 (e.g., MSISDN and the like), information about one or more debit or credit cards to withdraw funds from, and the like.

The mobile device host application 1018 may receive the transaction identifier and/or information identifying the mobile device 910 and access the account of the user of mobile device 910. For example, mobile device host application 1018 may access the user account using the MSISDN number or other information provided by mobile device 910. The mobile device host application 1018 may also use the transaction identifier to determine the geographic location of ATM device 1010, such as by accessing the previously described one or more databases to determine the association between the transaction identifier and the geographic identifier. In one embodiment, the mobile device host application 1018 may access the user's account to determine credit and/or debit card account information from which to withdraw funds for the withdrawal transaction. In other embodiments, this information (i.e., the data and/or credit card account information) may have been previously provided from the user, such as in step 1045.

At step 1050, the mobile device host application 1018 may transmit information to the ATM host application 1016 in order to complete the money withdrawal transaction. In one embodiment, the information routed from mobile device host application 1018 may include the geographic identifier of ATM device 1010, a withdrawal amount to withdraw from ATM device 1010, account information of the user (i.e., PAN, BIN, and the like), and the like. At step 1055, the ATM host application 1016 may transmit some or all of this information to ATM device 1010. For example, ATM host application 1016 may transmit 1055 an "impending transaction message" to ATM device 1010 that includes the withdrawal amount, account information of the user (i.e., PAN, BIN, and the like), and/or any other information necessary to complete the money withdrawal transaction. ATM host application 1016 may use the geographic identifier provided by mobile device host application 1018 to determine which ATM device 1010 to transmit the impending transaction message to. In other words, the mobile device host application 1018 may control the ultimate destination of the impending transaction message from ATM host application 1016 based on the geographic location information the mobile device host application 1018 provides to ATM host application 1016.

In embodiments in which communications systems 1020 is used, the impending transaction message may be transmitted from ATM host application 1016 to communications systems 1020 and then subsequently routed to ATM device 1010. The ATM device 1010 receives the impending transaction message 1055 and/or 1060 and is now ready to complete the money withdrawal transaction. In other words, the ATM device 1010 now has all the information necessary to complete the transaction except an authorization from the user and/or the PIN number of the user. The ATM device 1010 may display the information it receives from ATM host application 1016 to the user, such as the withdrawal amount, the account number (i.e., debit or credit card), and the like. In some embodiments, some of this information, but not all the information is displayed to the user. For example, the last four digits of the credit or debit card may be displayed to the user so that the user may identify and confirm or authorize use of the credit or debit card.

The impending transaction message 1055 and/or 1060 that is ultimately relayed to ATM device 1010 includes the same information that is typically input into ATM device 1010 in conventional money withdrawal transactions, such as when a user swipes a debit and/or credit card through a card reader of the ATM device 1010. For example, when a user swipes a credit and/or debit card through a card reader, the ATM device 1010 typically captures the account information (i.e., PAN, BIN, and the like) from a debit and/or credit card and requests that the user input the withdrawal amount and/or PIN number into the ATM device 1010. In the money withdrawal transaction described herein, since the ATM device 1010 includes the same information that is typically input into an ATM device, the process of withdrawing money from the ATM device 1010 is essentially the same as conventional processes. As such, additional hardware and/or software is not needed, or minimal changes may be necessary for existing ATM devices.

Figure 11:
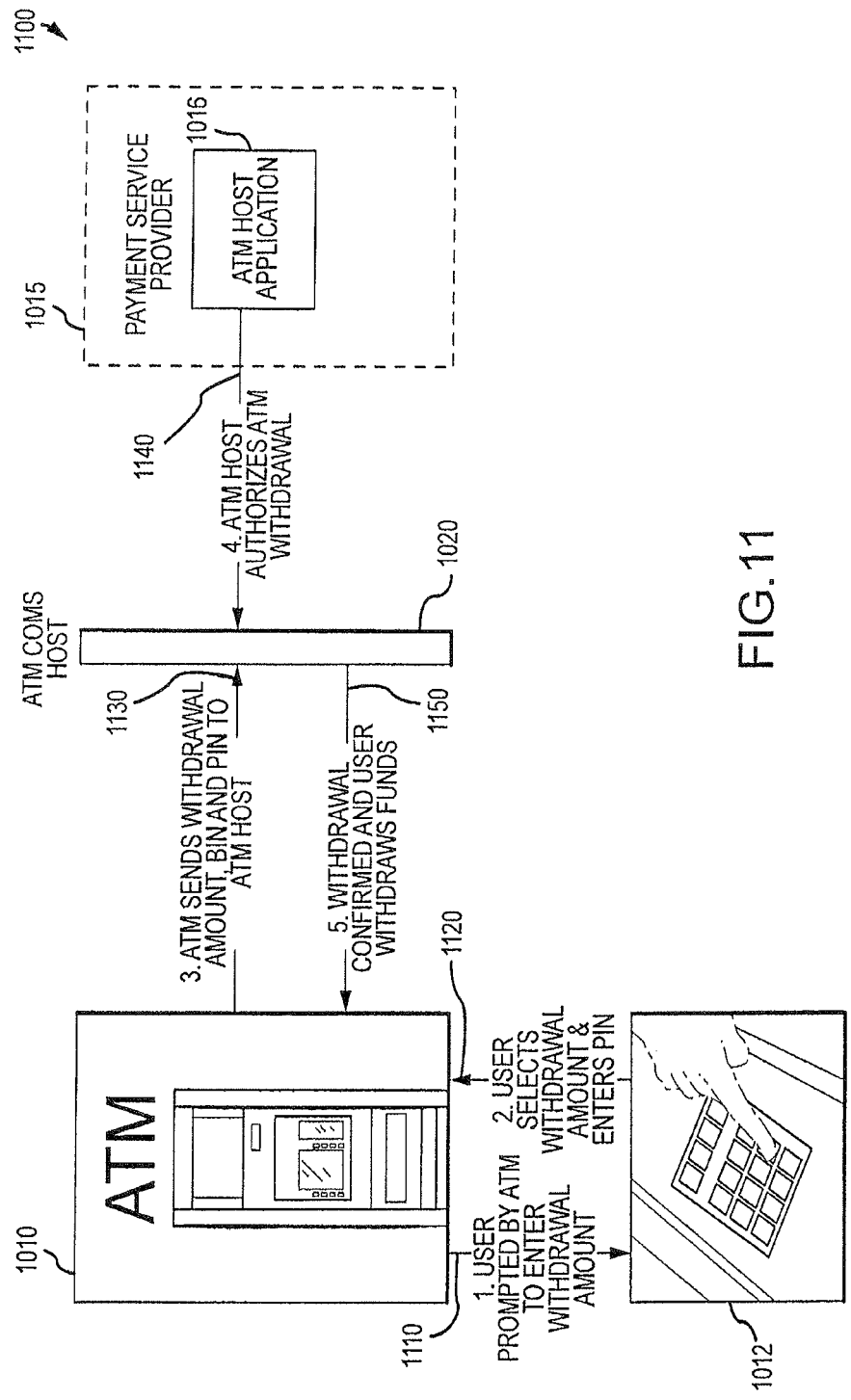
FIG. 11 illustrates an embodiment of completing a money withdrawal transaction at a funds dispensing device according to an embodiment of the present invention.

Referring now to FIG. 11, illustrated is an embodiment 1100 of completing a money withdrawal transaction. Specifically, at step 1110 ATM device 1010 prompts the user to enter one or more pieces of information into the ATM device 1010. For example, in one embodiment the ATM device 1010 may prompt the user to enter a withdrawal amount and/or PIN number into ATM device 1010 via a keypad 1012. In other embodiments, ATM device 1010 may only require the user to enter a PIN number into ATM device 1010 via keypad 1012 since the withdrawal amount may have been previously provided via mobile device 910, mobile device host application 1018, and/or ATM host application 1016. In still other embodiments, the user may enter the PIN number into the mobile device 910 without entering this information into the ATM device 1010. At step 1120, the user enters the requested information into ATM device 1010 via keypad 1012. At step 1130, the ATM device transmits withdrawal information to ATM host 1016 in order to authorize withdrawal of funds from ATM device 1010 in an amount equal to the withdrawal amount. The withdrawal information may include the withdrawal amount, account information (i.e., PAN, BIN, and the like), the PIN number, and/or any other information necessary to complete the money withdrawal transaction. The withdrawal information message sent from ATM device 1010 is essentially equivalent to conventional withdrawal messages transmitted from the ATM device using conventional withdrawal processes, such as when a user swipes a debit or credit card through a card reader of ATM device 1010.

The withdrawal information may be routed to ATM host 1016 via communications system 1020 or, in some embodiments, directly routed to ATM host 1016. Upon receiving the withdrawal information, ATM host 1016 may authorize the withdrawal transaction, or transmit the withdrawal information to one or more other systems (e.g., authorization network), and transmit an authorization message 1140 to ATM device 1010 to allow funds to be withdrawn from ATM device 1010. In embodiments that involve the of communications systems 1020, the withdrawal authorization message 1140 may be routed through communication system 1020 as message 1150. The user may then withdraw funds from ATM device 1010 and complete the transaction.

Figure 12:
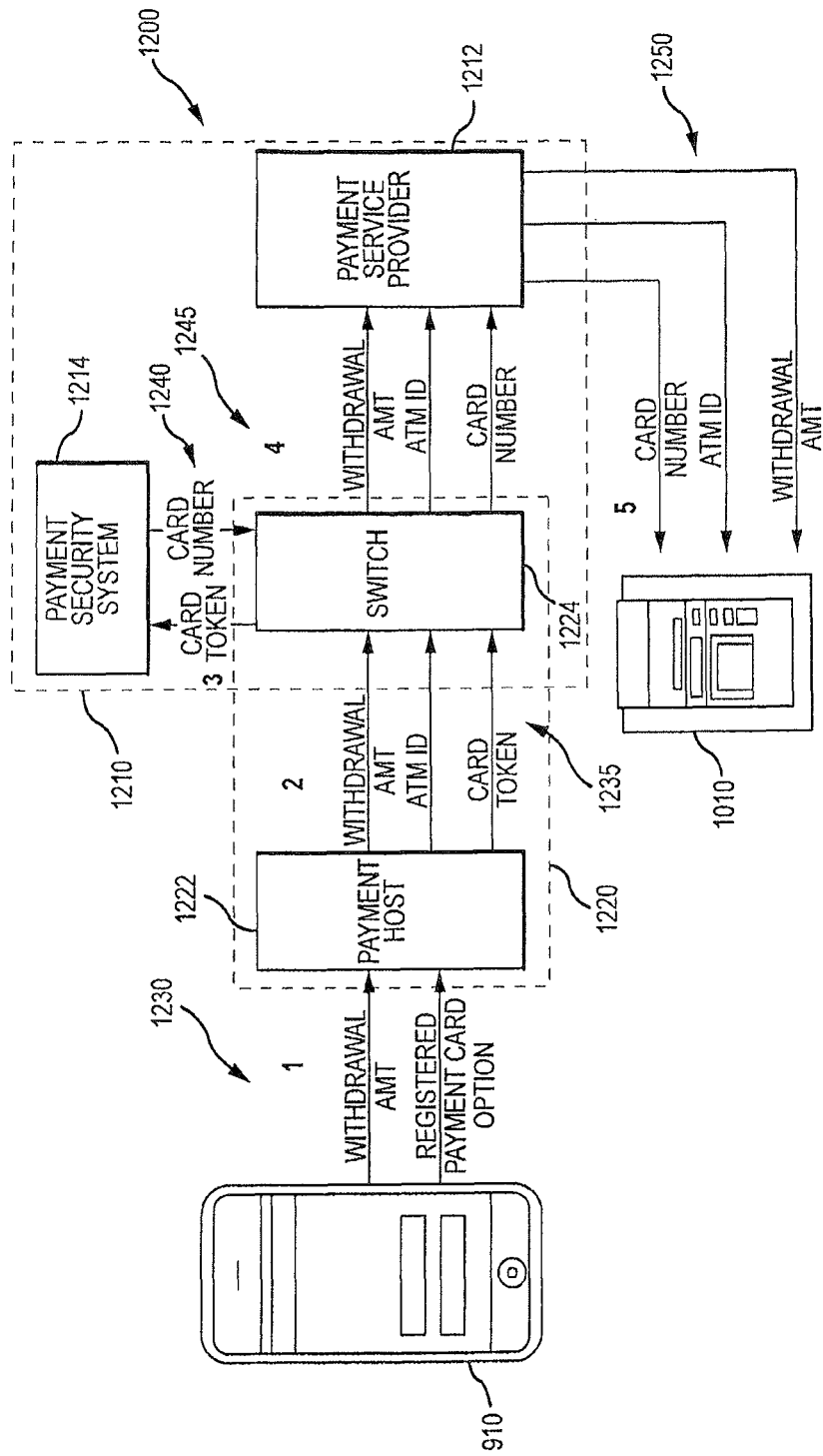
FIG. 12 illustrates another embodiment of using a mobile device to perform a money withdrawal transaction at a funds dispensing device according to an embodiment of the present invention.

Referring now to FIG. 12, illustrated is another embodiment 1200 of a system that may be used to perform a money withdrawal transaction. The system of FIG. 12 is similar to the system of FIGS. 10 and 11 except that the system of FIG. 12 includes at least two subsystems that communicatively operate with one another to perform the money withdrawal transaction. Specifically, the system FIG. 12 includes a payment service provider 1212 and a payment host 1222 that relay information to each other and to the mobile device 910 and/or ATM device 1010 to perform the money withdrawal transaction. Several additional subsystems, such as a switch 1224 and/or payment security system 1214 may be used in performing the money withdrawal transaction. The subsystem may be operated by payment service provider 1212 or payment host 1222. For example, in one embodiment the dashed line 1210 may represent a payment service provider 1210 that includes a payment service application 1212, a switch application 1224, and a payment security system application 1214. The payment service provider 1210 may communicatively operate with payment host 1222, ATM device 1010, and/or mobile device 910 to perform the money withdrawal transaction. In another embodiment, the dashed line 1220 may represent a payment host system 1220 that includes a payment host application 1222 and a switch application 1224. The payment host 1220 may communicatively operate with payment service provider 1212, payment security system 1214, ATM device 1010, and/or mobile device 910 to perform the money withdrawal transaction. In other embodiments, the switch 1224 and/or payment security system 1214 may not be used in the money withdrawal process so that the system of FIG. 12 includes essentially only payment post 1222 and payment service provider 1212.

For ease in describing the money withdrawal transaction embodiments, the description will focus on the information being relayed to and/or from the various subsystems (i.e., 1222, 1224, 1214, and/or 1212) without describing the subsystems as being included or operated by either payment service provider 1210 or payment host system 1220. It should be realized, however, that the various subsystems may be included within or operated by either payment service provider 1210, payment host system 1220, or utilized independently in any manner to perform the money withdrawal transaction, and all such variations or combinations are contemplated herein.

In performing the money withdrawal transaction, mobile device 910 may transmit information to payment host 1222 in step 1230. The information may include a withdrawal amount and information about the mobile device 910 as previously described. Information about the mobile device 910 may be used to access an account of the user of mobile device 910 to determine an account number to use in withdrawing funds and the like. In other embodiments, the account information from which to withdraw funds may be sent for mobile device 910 along with the withdrawal amount. In some embodiments, this information is transmitted from mobile device 910 upon the mobile device 910 capturing the transaction identifier displayed on ATM device 1010, such as by photographing a QR code displayed on the ATM device. In still other embodiments, upon receiving information from mobile device 910, payment host 1222 may transmit a withdrawal message to mobile device 910. The withdrawal message may request the user to input one or more pieces of information, such as a withdrawal amount, selection of a credit or debit card to use in the withdrawal transaction, an authentication question, and the like. The debit or credit cards available for use in the withdrawal transaction may be displayed on mobile device 910, such as in a drop-down box of the APP, to allow the user to quickly and conveniently select a debit or credit card to use in the transaction. The debit or credit cards may have been previously registered with the payment host 1222 as previously described.

At step 1235, the payment host 1222 may transmit the withdrawal information to switch 1224. The withdrawal information may include the withdrawal amount, a geographic identifier of ATM device 1010, and/or a token of an account from which to withdraw funds. As previously described, the geographic identifier of ATM device 1010 may be determined by an association between the geographic identifier and the transaction identifier, which has been previously made by payment host 1222. Payment host 1222 may access one or more databases (not shown) to determine the geographic identifier of ATM device 1010 and/or the token of the account from which to withdraw funds. The token of the account from which to withdraw funds may be determined by accessing an account of the user as previously described. In some embodiments, the token includes some information of the user's account, but not all the account information. In other embodiments, the token may merely be an identifier that points to or otherwise identifies account information that is stored in another location or maintained by another system (e.g., payment security system 1214). In this manner, the user's account information need not be stored by payment host 1222, but rather only a portion (i.e., token) of the account information or some other piece of information identifying the account may be stored by payment host 1222.

Switch 1224 may be used to relay information to payment service provider 1212 and/or payment security system 1214. For example, at step 1240, switch 1224 may receive the withdrawal information and route the token information to payment security system 1214 in order to obtain account information (i.e., PAN, BIN, and the like) from payment security system 1214. In this manner, the account information may be stored in payment security system 1214 without requiring the account information to be stored by other systems, such as payment host 1222. In this manner, security of the withdrawal process is improved since the account information need not be stored in multiple locations thereby reducing the possibility of fraud or theft of sensitive information. At step 1240, switch 1224 may receive the account information transmitted from payment security system 1214 and at step 1245, switch 1224 may transmit the account information along with the withdrawal amount and the geographic identifier of ATM device 1010 to payment service provider 1212. At step 1250, upon receiving this information, payment service provider 1212 may transmit the account information (i.e., PAN, BIN, and the like), the withdrawal amount, and or any other information necessary to complete the money withdrawal transaction to ATM device 1010. In some embodiments, the geographic identifier may also be transmitted from payment service provider 1212 to ATM device 1010, although in most embodiments the geographic identifier is used by payment service provider 1212 merely to identify the specific ATM device 1010 to route the withdrawal information to. Upon receiving the information from payment service provider 1212 at step 1250, ATM device 1010 now possess essentially all the information necessary to complete the money withdrawal transaction, except an authorization from the user and/or the PIN number from the user.

Figure 13:
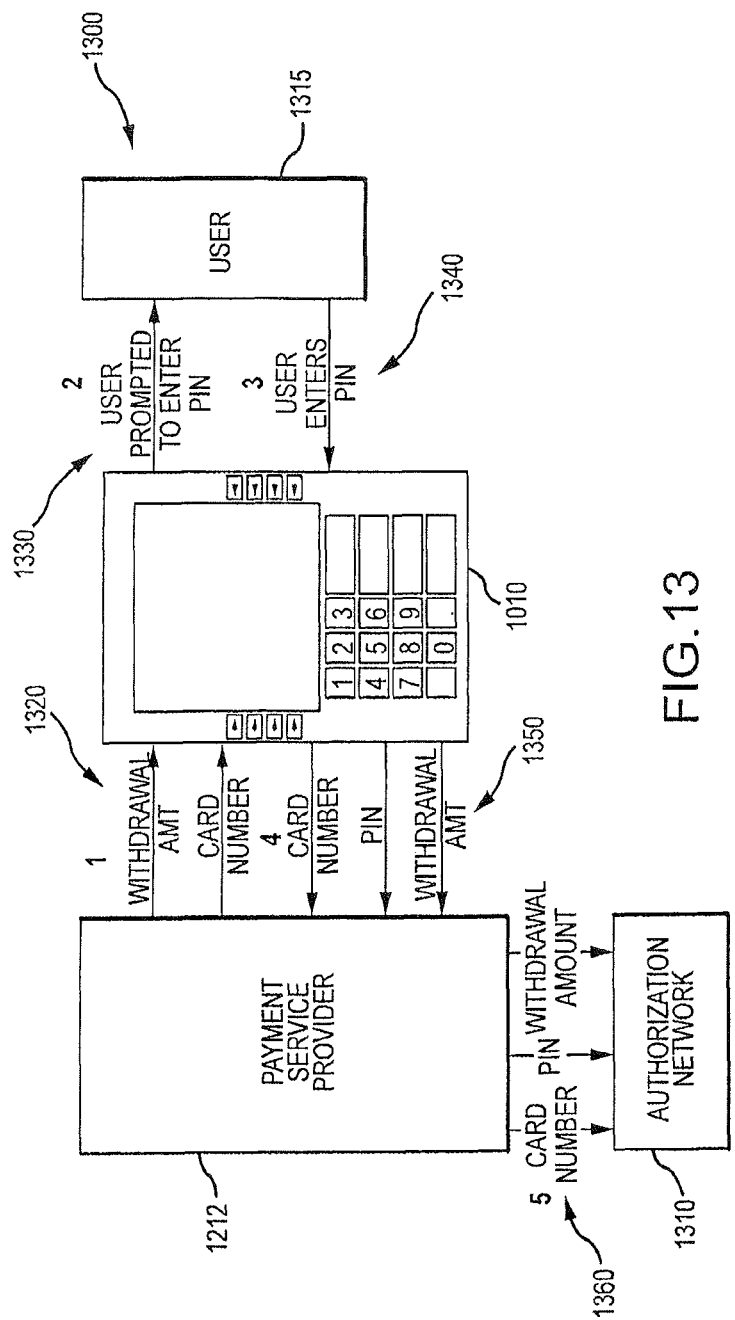
FIG. 13 illustrates another embodiment of completing a money withdrawal transaction at a funds dispensing device according to an embodiment of the present invention.

FIG. 13 illustrates an embodiment 1300 of completing the money withdrawal transaction. Specifically, at step 1320 the withdrawal amount and account number (i.e., PAN, BIN, and the like) are transmitted from payment service provider 1212 to ATM device 1010 as previously described. At step 1330, ATM device 1010 prompts a user 1315 to input various information into ATM device 1010, such as the PIN number, and the like. In some embodiments, user 1315 may be prompted to confirm the withdrawal amount or to enter a withdrawal amount if the withdrawal amount has not been previously provided. In other embodiments, the user may have the option to change or adjust a withdrawal amount previously submitted with mobile device 910. In still other embodiments, the user may enter the PIN number into the mobile device 910 instead of or in addition to entering the PIN number into ATM device 1010.

At step 1340, user 1315 enters the PIN number and/or any other information requested by ATM device 1010, such as by entering or confirming the withdrawal amount. At step 1350, ATM device 1010 transmits the account number (i.e., PAN, BIN, and the like), withdrawal amount, and PIN number to payment service provider 1212. In turn, at step 1360, payment service provider 1212 transmits this information to authorization network 1310 for subsequent authorization of the withdrawal transaction. Although not shown, an authorization message is subsequently transmitted from authorization network 1310 to payment service provider 1212 and ATM device 1010 to authorize withdrawal of funds from ATM device 1010.

According to any of the embodiments described herein, in registering the mobile device 910 with the payment service provider 1212 or payment host system 1222, the user may provide various information to the payment service provider/host system. For example in one embodiment, the user may provide account information, a preferred language of use for the transaction, and a preferred withdrawal amount. This information may be stored in the user's account created by payment service provider/host system and used subsequently in the money withdrawal transaction. For example, upon receiving a request to perform the money withdrawal transaction, the payment service provider/host system may transmit default or preferred account information and a preferred withdrawal amount to the user and request that the user confirm to use the preferred account information and/or preferred withdrawal amount or input other account and/or withdrawal information.

Further, in registering the account information, the payment service provider/host system may create a token and associate the token with the account information. The token and associated account information may be provided to payment security system 1214 so that in subsequent use, the token may be provided to payment security system 1214 to receive the account information therefrom as described previously. In this manner, the actual account information may be stored only by the payment security system 1214.

In some embodiments, the payment service provider 1212 may provide the payment host 1222 with information about a plurality of ATM devices 1010 with which the payment service provider 1212 operates in performing withdrawal transactions. The information may include a listing of ATM identifiers and geographic identifiers for each ATM device 1010 with which the payment service provider 1212 operates. The payment host 1222 may receive this information from payment service provider 1212 and use this information to associate transaction identifiers (i.e., QR codes and the like) with the ATM identifiers and geographic identifiers of the various ATM devices 1010. The payment host 1222 may then store the association it created between the transaction identifiers and the ATM identifiers and geographic identifiers in one or more databases for subsequent use in money withdrawal transactions as described herein. In one embodiment, as the associations are made between transaction identifiers and the ATM identifiers and/or geographic identifiers, the transaction identifiers may be transmitted from the payment host 1222 to the payment service provider 1212 for subsequent transmission to the ATM device 1010 so that the transaction identifiers may be displayed on the ATM devices 1010 and/or captured therefrom by the mobile device 910.

In a specific embodiment, a transaction identifier may be transmitted from payment service provider 1212 to the ATM device 1010 along with a withdrawal authorization message that is used to complete a currently pending money withdrawal transaction. The transaction identifier transmitted with the withdrawal authorization message may be stored on the ATM device 1010 for subsequent use in a money withdrawal transaction. In this manner, ATM device 1010 may always have a transaction identifier currently available for use by a user in a money withdrawal transaction. In another embodiment, the transaction identifier may be transmitted to ATM device 1010 subsequent to a user requesting performance of a money withdrawal transaction via mobile device 910. In yet another embodiment, one or more transaction identifiers may be cached on the ATM device 1010. The transaction identifier(s) could be stored on the ATM device 1010 long term, could be uploaded to the ATM device 1010 after some or each transaction, or could be uploaded as part of an end of day batching process.

In some embodiments, the ATM device 1010 may convert one or more of the transaction identifiers into machine readable code (e.g., QR code, a barcode, near field communication code, and the like). Using such approach may speed up money withdrawal transactions by eliminating the need for the ATM device 1010 to establish contact with the payment service provider 1212 before displaying or providing the transaction identifier. In some embodiments, the transaction identifier may have a "shelf life" or defined amount of time in which the transaction identifier may be used. This "shelf life" may depend on the ATM device 1010 location, withdrawal limits, and the like.

Regardless of how the transaction identifier is ultimately transmitted to ATM device 1010, an advantage of the money withdrawal transactions described herein is that the transaction identifiers are unique to a single transaction. In other words, the transaction identifiers are designed to be used a single time and subsequently discarded. This eliminates or reduces the risk of fraudulent money withdrawal transactions and also ensures that when a user captures a transaction identifier from an ATM device 1010, the process will be completed at that specific ATM device and money will be dispensed therefrom. For example, if an ATM device 1010 repeatedly used the same transaction identifier and the user stored the transaction identifier information on their mobile device 910, it would be possible for the user to initiate and or perform a money withdrawal transaction without being physically present at the ATM device 1010. For example, if the user stored an image of a QR code of an ATM device 1010, the user (or someone else that gained access to the image) could subsequently submit the image of the QR code to a payment service provider and initiate or perform a money withdrawal transaction without being physically present at the ATM device 1010. Such a situation could enable other to steal the image and initiate or perform fraudulent money withdrawal transactions. The use of a unique transaction identifier eliminates this potential issue because the user would be required to be physically present at the ATM device 1010 in order to capture the unique transaction identifier therefrom.

Figure 14:
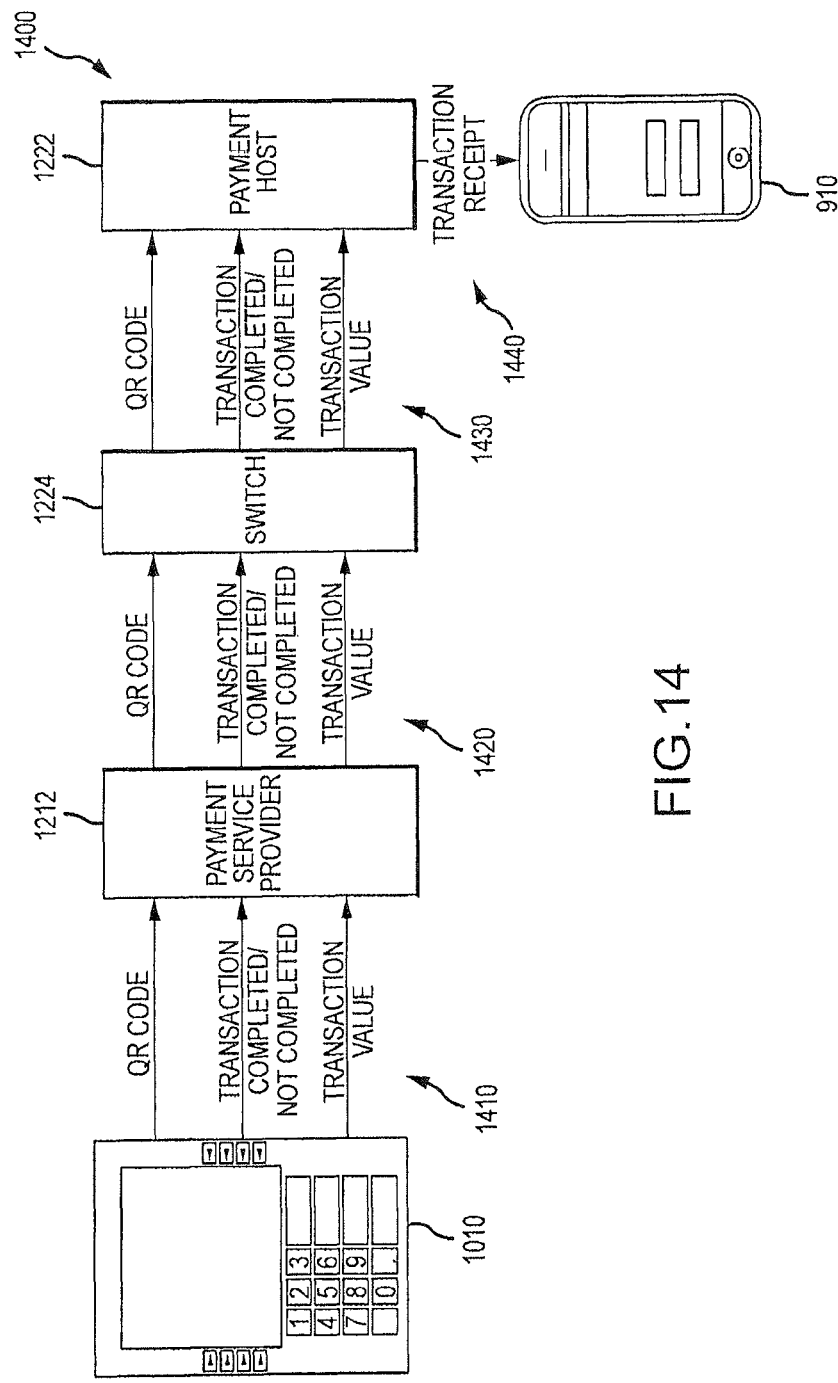
FIG. 14 illustrates an embodiment of transmitting receipt information to a mobile device subsequent to completion of a money withdrawal transaction according to an embodiment of the present invention.

Referring now to FIG. 14, illustrated is an embodiment 1400 of transmitting receipt information to the mobile device 910 subsequent to a money withdrawal transaction being performed. Specifically, at step 1410, ATM device 1010 may submit the transaction value, the transaction identifier (i.e., QR code and the like), and a message regarding the completion or failure to complete the money withdrawal transaction to payment service provider 1212. At step 1420, payment service provider 1212 may in turn optionally transmit this information to switch 1224, which may in turn optionally transmit this information to payment host 1222 at step 1430. At step 1440, payment host 1222 may then transmit a transaction receipt to mobile device 910. The transaction receipt may include any or all of the information transmitted from ATM device 1010, such as the transaction value, the transaction identifier (i.e., QR code and the like), the transaction completion or failure message, and/or any other information desired. Mobile device 910 may store this information in a mobile wallet, receipt book, on or via the APP previously described, and the like. In some embodiments, the information may be relayed directly from ATM device 1010 to any of the subsystems described herein (i.e., payment service provider 1212, switch 1224, and/or payment host 1222), or directly to mobile device 910.

Figure 15:
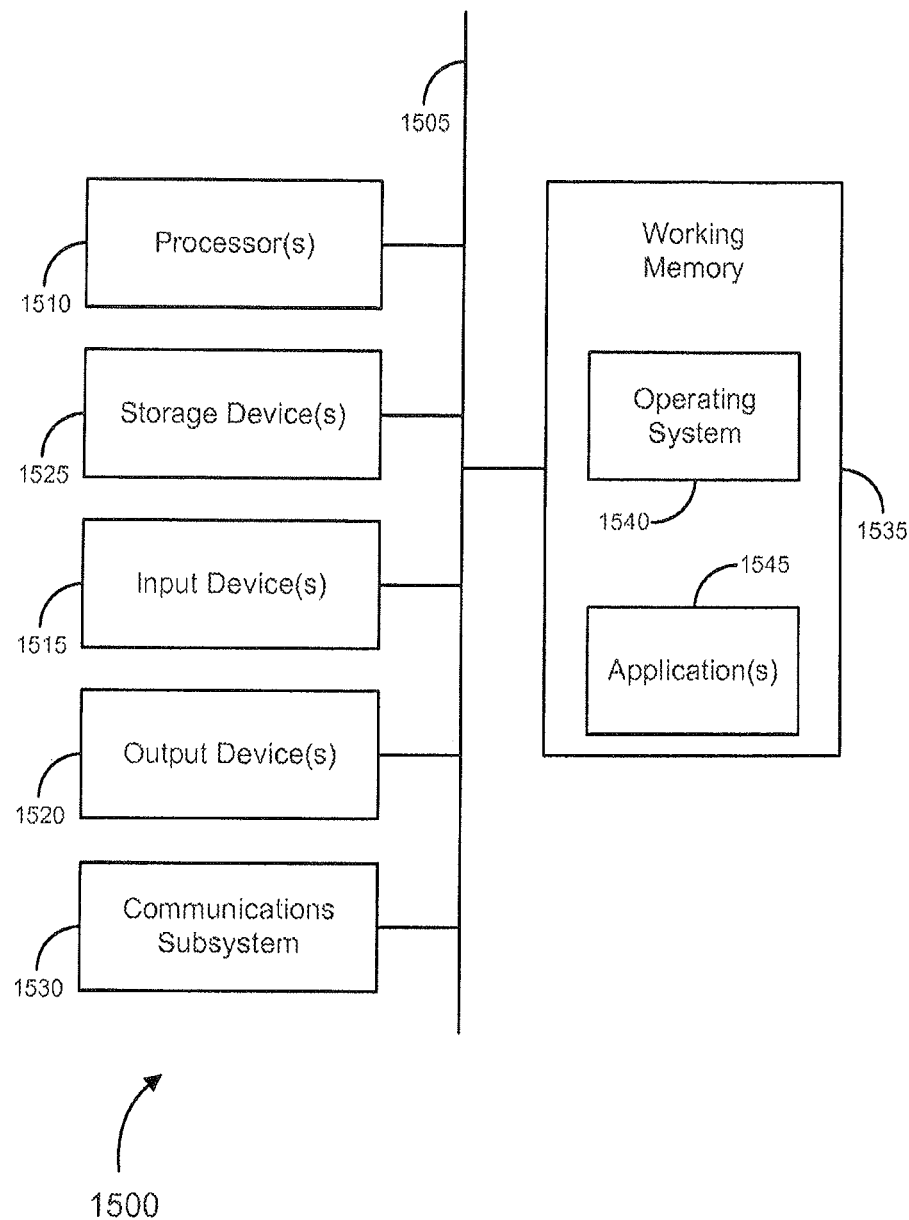
FIG. 15 illustrates a computer system that may be used to implement the methods and systems described herein according to an embodiment of the present invention.

To perform the actions of the payment or withdrawal transactions, a computer system 1500 as illustrated in FIG. 15 may be used. The computer system 1500 may also represent one or more components of the payment system, switch, payment host, wireless host, and/or any of the other previously mentioned computing devices described herein. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner.

The computer system 1500 is shown comprising hardware elements that can be electrically coupled via a bus 1505 (or may otherwise be in communication, as appropriate). The hardware elements may include one or more processors 1510, including without limitation one or more general-purpose processors and/or one or more special-purpose processors (such as digital signal processing chips, graphics acceleration processors, and/or the like); one or more input devices 1515, which can include without limitation a mouse, a keyboard and/or the like; and one or more output devices 1520, which can include without limitation a display device, a printer and/or the like.

The computer system 1500 may further include (and/or be in communication with) one or more storage devices 1525, which can comprise, without limitation, local and/or network-accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1500 might also include a communications subsystem 1530, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1530 may permit data to be exchanged with a network (such as the network described below, to name one example), other computer systems, and/or any other devices described herein. In many embodiments, the computer system 1500 will further comprise a working memory 1535, which can include a RAM or ROM device, as described above.

The computer system 1500 also can comprise software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1525 described above. In some cases, the storage medium might be incorporated within a computer system, such as the system 1500. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1500) to perform methods in accordance with various embodiments of the invention. According to a set of embodiments, some or all of the procedures of such methods are performed by the computer system 1500 in response to processor 1510 executing one or more sequences of one or more instructions (which might be incorporated into the operating system 1540 and/or other code, such as an application program 1545) contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processor(s) 1510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1500, various computer-readable media might be involved in providing instructions/code to processor(s) 1510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1525. Volatile media include, without limitation, dynamic memory, such as the working memory 1535. Transmission media include, without limitation, coaxial cables, copper wire and fiber optics, including the wires that comprise the bus 1505, as well as the various components of the communication subsystem 1530 (and/or the media by which the communications subsystem 1530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1500. These signals, which might be in the form of electromagnetic signals, acoustic signals, optical signals and/or the like, are all examples of carrier waves on which instructions can be encoded, in accordance with various embodiments of the invention.

The communications subsystem 1530 (and/or components thereof) generally will receive the signals, and the bus 1505 then might carry the signals (and/or the data, instructions, etc. carried by the signals) to the working memory 1535, from which the processor(s) 1505 retrieves and executes the instructions. The instructions received by the working memory 1535 may optionally be stored on a storage device 1525 either before or after execution by the processor(s) 1510.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those skilled in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for operating a payment service provider system to perform a money withdrawal transaction at an automated teller machine (ATM) using a mobile device, the method comprising:

at a payment service provider system, associating a transaction identifier with a geographic identifier of an ATM;

transmitting the transaction identifier from the payment service provider system to the ATM, wherein the transaction identifier is converted into machine readable code for subsequent display on the ATM, wherein the transaction identifier is transmitted from the payment service provider system to the ATM at the completion of a transaction for capture by the user in a subsequent transaction;

receiving at the payment provider system from a mobile device of a user, the transaction identifier and identification information for the mobile device, the mobile device having obtained the transaction identifier by capturing the machine readable code displayed on the ATM;

determining, at the payment service provider system, the geographical identifier of the ATM based on the association between the received transaction identifier and the geographic identifier of the ATM;

identifying, at the payment service provider system, a service account associated with the user and to be used for the withdrawal transaction, based on the identification information for the mobile device;

receiving a withdrawal amount at the payment service provider system from the mobile device;

accessing, at the payment service provider system, the identified service account to determine account information for the service account;

transmitting, from the payment service provider system to the ATM, the withdrawal amount and the account information, based on the determined geographical identifier of the ATM;

receiving at the payment service provider system a personal identification number (PIN) provided by the user; and transmitting the withdrawal amount, account information, and PIN from the payment service processor system to an authorization network so as to authorize withdrawal of funds from the ATM in an amount equivalent to the withdrawal amount.

2. The method of claim 1, wherein the machine readable code comprises a QR code that is displayed on the ATM, and wherein the mobile device captures the QR code by photographing the QR code displayed on the ATM.

3. The method of claim 1, wherein the transaction identifier is in a batch of transaction identifiers provided to the ATM device at predetermined periods of time.

4. The method of claim 3, wherein there is a defined amount of time during which the transaction identifier may be used.

5. The method of claim 1, wherein the transaction identifier and the identification information for the mobile device are received directly from the mobile device at the payment service provider system without the mobile device being bi-directionally communicatively coupled with the ATM.

6. The method of claim 1, wherein the geographical identifier is used to determine the ATM at which the withdrawal transaction is to be conducted.

7. The method of claim 1, wherein the machine readable code is unique to a single withdrawal transaction, such that the machine readable code is unusable after completion of the withdrawal transaction.

8. The method of claim 1, further comprising transmitting, from the payment service provider system to the mobile device, withdrawal information unique to the user, wherein the withdrawal information unique to the user comprises:
a default withdrawal amount;
a language preference; or
an identification of withdrawal accounts registered with the payment service provider system.

9. The method of claim 8, further comprising receiving from the mobile device a selection of a withdrawal account from among a plurality of identified withdrawal accounts from which to withdraw funds.

10. The method of claim 1, wherein the identified service account is selected by the payment service provider system.

11. The method of claim 1, wherein the PIN is input into the ATM by the user.

12. The method of claim 1, wherein the PIN is input into the mobile device by the user.

13. The method of claim 1, further comprising registering the mobile device with the payment service provider system, wherein registering the mobile device comprises receiving one or more of the following from the mobile device:
account information for one or more withdrawal accounts;
a default withdrawal amount; or
a language preference.

14. A payment system for performing a money withdrawal transaction at an automated teller machine (ATM), comprising:
a memory device having instruction stored thereon; and
a processor communicatively coupled with the memory, wherein the instructions stored on the memory cause the processor to:
associate a transaction identifier with a geographic identifier of an ATM;
transmit the transaction identifier from the payment system to the ATM, wherein the transaction identifier is converted into machine readable code for subsequent display on the ATM, wherein the transaction identifier is transmitted from the payment system to the ATM at the completion of a transaction for capture by the user in a subsequent transaction;
receive, at the payment system from a mobile device of a user, the transaction identifier and identification information for the mobile device, the mobile device having obtained the transaction identifier by capturing the machine readable code displayed on the ATM;
determine, at the payment system, the geographical identifier of the ATM based on the association between the received transaction identifier and the geographic identifier of the ATM;
identify, at the payment system, a service account associated with the user and to be used for the withdrawal transaction, based on the identification information for the mobile device;
receive a withdrawal amount at the payment system from the mobile device;
access, at the payment system, the identified service account to determine account information for the service account;
transmit, from the payment system to the ATM, the withdrawal amount and the account information, based on the determined geographical identifier of the ATM;
receive at the payment system a personal identification number (PIN) provided by the user; and
transmit the withdrawal amount, account information, and PIN from the payment system to an authorization network so as to authorize withdrawal of funds from the ATM in an amount equivalent to the withdrawal amount.

15. The method of claim 14, wherein the machine readable code comprises a QR code that is displayed on the ATM, and wherein the mobile device captures the QR code by photographing the QR code displayed on the ATM.

16. The method of claim 14, wherein the transaction identifier is in a batch of transaction identifiers provided to the ATM device at predetermined periods of time.

17. The method of claim 16, wherein there is a defined amount of time during which the transaction identifier may be used.

18. The method of claim 14, wherein the transaction identifier and the identification information for the mobile device are received directly from the mobile device at the payment system without the mobile device being bi-directionally communicatively coupled with the ATM.

* * * * *